United States Patent
Zhang et al.

(10) Patent No.: US 12,549,990 B2
(45) Date of Patent: Feb. 10, 2026

(54) MEASUREMENT METHOD AND APPARATUS

(71) Applicant: Huawei Technologies Co., Ltd., Shenzhen (CN)

(72) Inventors: Li Zhang, Beijing (CN); Jing Han, Beijing (CN); Hong Li, Beijing (CN); Zhongyi Shen, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 363 days.

(21) Appl. No.: 18/344,637

(22) Filed: Jun. 29, 2023

(65) Prior Publication Data

US 2023/0345286 A1 Oct. 26, 2023

Related U.S. Application Data

(63) Continuation of application No. PCT/CN2021/143440, filed on Dec. 30, 2021.

(30) Foreign Application Priority Data

Dec. 31, 2020 (WO) ................ PCT/CN2020/142407
Apr. 2, 2021 (WO) ................ PCT/CN2021/085456

(51) Int. Cl.
*H04W 24/10* (2009.01)
*H04W 24/08* (2009.01)

(52) U.S. Cl.
CPC .......... *H04W 24/10* (2013.01); *H04W 24/08* (2013.01)

(58) Field of Classification Search
CPC ............................... H04W 72/10; H04L 12/50
USPC ......................................... 370/329, 401, 403
See application file for complete search history.

(56) References Cited

U.S. PATENT DOCUMENTS

| | | | |
|---|---|---|---|
| 2020/0137605 A1 | 4/2020 | Liu et al. | |
| 2024/0172024 A1* | 5/2024 | Zhang ................... | H04W 24/00 |

FOREIGN PATENT DOCUMENTS

| | | |
|---|---|---|
| CN | 107637120 A | 1/2018 |
| CN | 108366379 A | 8/2018 |
| CN | 109891916 A | 6/2019 |
| CN | 110537375 A | 12/2019 |
| CN | 110557976 A | 12/2019 |
| CN | 111434147 A | 7/2020 |
| WO | 2018085459 A1 | 5/2018 |
| WO | 2018089917 A1 | 5/2018 |
| WO | 2018144927 A1 | 8/2018 |

OTHER PUBLICATIONS

Qualcomm Inc.,"Enhanced Gaps for Inter-frequency Measurements", 3GPP TSG-RAN WG4 Meeting#75, R4-153066, Fukuoka, Japan, May 25-29, 2015, 2 pages.

(Continued)

*Primary Examiner* — Dang T Ton
(74) *Attorney, Agent, or Firm* — Slater Matsil, LLP

(57) ABSTRACT

A terminal determines whether a measurement gap type corresponding to a first group of MOs is an MG or an NCSG, measures the first group of MOs based on the measurement gap type corresponding to the first group of MOs, and determines a data transmission behavior in a serving cell of the terminal based on the measurement gap type corresponding to the first group of MOs.

20 Claims, 5 Drawing Sheets

(56) References Cited

OTHER PUBLICATIONS

Huawei et al., "Discuss on Measurement Gap Configuration and Signalling", 3GPP TSG-RAN WG4 Meeting #77, R4-157091, Anaheim, CA, US, Nov. 16-20, 6 pages.

Qualcomm Inc., "Motivations for measurement gap enhancements WI in NR R17", 3GPP TSG-RAN Meeting #89e, RP-201687, Electronic Meeting, Sep. 14-18, 2020, 5 pages.

Intel, "CR on short gap for LTE measurement inTS36.133", 3GPP TSG-RAN4 Meeting #87, R4-1806336, Busan, Korea, May 21-25, 2018, 3 pages.

3GPP TS 36.133 V16.7.0 (Sep. 2020), 3rd Generation Partnership Project; Technical Specification Group Radio Access Network; Evolved Universal Terrestrial Radio Access (E-UTRA); Requirements for support of radio resource management (Release 16), 3,703 pages.

\* cited by examiner

MEASUREMENT METHOD AND APPARATUS

CROSS-REFERENCE TO RELATED APPLICATIONS

This application is a continuation of International Application No. PCT/CN2021/143440, filed on Dec. 30, 2021, which claims priority to International Patent Application No. PCT/CN2020/142407, filed on Dec. 31, 2020 and International Patent Application No. PCT/CN2021/085456, file on Apr. 2, 2021. All of the aforementioned patent applications are hereby incorporated by reference in their entireties.

TECHNICAL FIELD

Embodiments of this application relate to the field of communication technologies, and in particular, to a measurement method and an apparatus.

BACKGROUND

In a communication network, in a single radio frequency architecture, to measure a reference signal on a specific measurement object (MO), a terminal needs to tune a radio frequency of a serving cell to a radio frequency of the MO, receive the reference signal and measure the received reference signal on the radio frequency of the MO, and tune the radio frequency of the MO back to the radio frequency of the serving cell after measurement is completed. In this process, data interruption occurs in the serving cell, and a measurement gap occurs.

In a multi-radio frequency architecture, to measure a reference signal on a specific MO, a terminal enables a radio frequency chain corresponding to the MO, receives the reference signal and measures the received reference signal on a radio frequency of the MO, and disables the radio frequency chain corresponding to the MO after measurement is completed. Because enabling or disabling of a plurality of radio frequency chains, such as a radio frequency chain corresponding to an MO and a radio frequency chain of a serving cell, may be controlled by a same control apparatus, enabling or disabling the radio frequency chain corresponding to the MO may cause data interruption of the serving cell, and a measurement gap occurs.

To reduce duration of data interruption in the serving cell and impact of the measurement gap on a data throughput of the serving cell, an MG enhancement project of the 3rd generation partnership project (3GPP) release 17 (R17) proposes a network-controlled small gap (NCSG), an NCSG pattern, and a related configuration. However, switching between the NCSG and the measurement gap (MG) is not discussed, and a measurement behavior of the terminal within a measurement length (ML) of the NCSG is not discussed.

SUMMARY

Embodiments of this application provide a measurement method and an apparatus, to resolve a problem that switching between an NCSG and an MG cannot be flexibly performed and a measurement behavior of a terminal is unclear when the NCSG takes effect.

To achieve the foregoing objectives, the following technical solutions are used in embodiments of this application.

According to a first aspect, a measurement method is provided. The method includes: A terminal determines a measurement gap type corresponding to a first group of MOs, where the measurement gap type includes an MG or an NCSG; the terminal measures the first group of MOs based on the measurement gap type corresponding to the first group of MOs; and determines a data transmission behavior in a serving cell of the terminal based on the measurement gap type corresponding to the first group of MOs.

Based on the method according to the first aspect, for a group of MOs, a measurement gap type used for the group of MOs is determined, a parameter of the NCSG is determined based on the determined measurement gap type, measurement (for example, radio control management (RRM) measurement) is performed on the first group of MOs, and a data transmission status in a serving cell is determined, and there is no need to allocate an NCSG pattern to each MO that requires an NCSG in the MOs. This reduces complexity of a measurement gap configuration and implements flexible switching between measurement gap types.

In a possible design, that a terminal determines that a measurement gap type corresponding to a first group of MOs is an NCSG, and the terminal measures the first group of MOs based on the measurement gap type corresponding to the first group of MOs includes: The terminal determines a parameter of the NCSG based on a parameter of an MG pattern configured by a network device for the first group of MOs, and determines a measurement behavior within an ML of the NCSG based on the parameter of the NCSG.

Based on this possible design, the parameter of the NCSG is determined based on the parameter of the configured MG pattern. In this way, a system design is simplified and the NCSG pattern does not need to be maintained. This reduces complexity of the NCSG configuration.

In a possible design, the method further includes: The terminal receives first information from the network device; and that a terminal determines a measurement gap type corresponding to a first group of MOs includes: The terminal determines, based on the first information, the measurement gap type corresponding to the first group of MOs. The first information is used for determining the measurement gap type.

Based on the possible design, the measurement gap type of the first group of MOs may be determined based on an instruction of the network device. This simplifies the system design, and reduces complexity of determining the measurement gap type by the terminal.

In a possible design, the first information indicates the measurement gap type; the first information is carried in second information, where the second information is used for configuring the MG pattern; the first information is carried in layer (layer, L) 1 signaling; or the first information is carried in L2 signaling.

Based on the possible design, the first information may be carried in a message for configuring the MG pattern, to reduce signaling overheads, or the first information is carried by using dedicated signaling, to improve diversity of bearer manners of the first information and reduce a delay of exchanging the first information.

In a possible design, the first information indicates whether the terminal is allowed to switch the measurement gap type, and that the terminal determines, based on the first information, the measurement gap type corresponding to the first group of MOs includes: The terminal determines, based on the first information, that the terminal is allowed to switch the measurement gap type, and the terminal determines, according to a first rule, the measurement gap type corresponding to the first group of MOs, where the first rule includes: when there is no first-type MO in the first group of MOs, the measurement gap type corresponding to the first group of MOs is an NCSG; or when there is a first-type MO in the first group of MOs, the measurement gap type corresponding to the first group of MOs is an MG; and the first-type MO includes an MO requiring an MG; or the terminal determines, based on the first information, that the terminal is not allowed to switch the measurement gap type, and the terminal determines that the measurement gap type corresponding to the first group of MOs is an MG.

Based on this possible design, the measurement gap type may be determined according to a preconfigured rule, to simplify the system design. In addition, the terminal and the network device may determine whether to apply the MG or the NCSG based on a requirement of the currently configured MO for the MG or the NCSG. This implements fast switching between the MG and the NCSG and avoids signaling interaction of switching between the MG and the NCSG when the MO changes.

In a possible design, that the terminal determines a parameter of the NCSG based on a parameter of an MG pattern configured by a network device for the first group of MOs includes: The terminal uses a measurement gap repetition period (MGRP) of the MG pattern as a visible interruption repetition period (VIRP) of the NCSG; and the terminal uses, as the ML of the NCSG, a time length obtained by removing a first visible interruption length (VIL) and a second VIL from a measurement gap length (MGL) of the MG pattern. Duration of the first VIL and duration of the second VIL are equal to duration of a VIL corresponding to the MG pattern.

Based on this possible design, the parameter of the NCSG may be determined based on the parameter of the MG pattern, to simplify the parameter configuration of the NCSG. In addition, a system VIL is set for all scheduling modes. This simplifies the system design.

In a possible design, the data transmission behavior includes uplink transmission, and that the terminal determines a data transmission behavior in a serving cell of the terminal based on the measurement gap type corresponding to the first group of MOs includes: The terminal determines whether to perform uplink transmission in n slots (slot) or symbols (symbol) after the first VIL, and determines whether to perform uplink transmission in n slots or symbols after the second VIL, where n is an integer greater than or equal to 0, and n is predefined in a protocol or is determined based on a communication parameter of the terminal.

Based on this possible design, the terminal may determine, based on internal implementation of the first VIL and the second VIL, whether to perform uplink transmission. This uplink transmission behavior of the terminal is the same as an uplink transmission behavior after the MG, that is, an existing procedure is reused. In addition, this avoids a need to define different VILs for different scheduling modes, and simplifies the system design.

In a possible design, if the MG pattern is an MG pattern configured at a granularity of the terminal, or the MG pattern is an MG pattern that is configured at a granularity of a frequency range (FR) and that corresponds to a first FR, the VIL corresponding to the MG pattern is 0.5 milliseconds (ms); or if the MG pattern is an MG pattern that is configured at a granularity of an FR and that corresponds to a second FR, the VIL corresponding to the MG pattern is 0.25 ms.

In a possible design, that the terminal determines a measurement behavior within an ML of the NCSG based on the parameter of the NCSG includes: If the terminal supports measurement of a third-type MO within the ML of the NCSG, the terminal measures a second-type MO and the third-type MO within the ML of the NCSG, where a measurement behavior of measuring the second-type MO and the third-type MO by the terminal is the same as a measurement behavior of the terminal outside the MGL of the MG; or if the terminal does not support measurement of a third-type MO within the ML of the NCSG, the terminal measures only a second-type MO within the ML of the NCSG, where a measurement behavior of measuring the second-type MO by the terminal is the same as a measurement behavior of the terminal within the MGL of the MG. The second-type MO includes an MO requiring an NCSG, and the third-type MO includes an MO requiring no MG and NCSG.

Based on the possible design, the terminal is allowed to measure or not measure another MO requiring no MG within the ML time of the NCSG based on whether the terminal supports measurement of the MO requiring no MG within the ML of the NCSG. Different terminals are distinguished for implementation, so that the terminal that can simultaneously support measurement of the two types of MOs can implement faster measurement, and the terminal that cannot simultaneously support measurement of the two types of MOs can reuse the existing implementation. This simplifies the system design and implements compatibility.

In a possible design, the terminal sends third information to the network device. The third information indicates whether the terminal supports measurement of the third-type MO within the ML of the NCSG. In this way, the network device determines a measurement delay of the terminal based on the third information. For example, the network device may estimate the measurement delay of the terminal based on the third information, and adjust the configuration of the MO or the MG based on a requirement of the network device for the measurement delay.

In a possible design, the method further includes: The terminal performs L1 measurement of the serving cell of the terminal within the ML of the NCSG, to improve resource utilization, and avoid impact of NCSG-based measurement on L1 measurement.

In a possible design, the terminal determines that the measurement gap type corresponding to the first group of MOs is an NCSG, an MO measured within the NCSG and an MO measured outside the NCSG correspond to a first measurement behavior.

Based on the possible design, it is ensured that measurement behaviors of to-be-measured MOs within and outside the NCSG are consistent. In this way, the terminal does not consider the NCSG as a special measurement opportunity for measuring a part of MOs during measurement, and does not consider the NCSG as an unavailable measurement opportunity.

In a possible design, the first measurement behavior includes one or more of the following: a scaling factor CSSF corresponding to each MO is obtained according to a first calculation manner, and the first calculation manner is a calculation manner used for measurement outside the MG; a scaling factor Kp for L3 measurement is equal to 1; a scaling factor Klayer1 for L1 measurement is determined based on measurement periods of all L1 measurement reference signals within and outside the NCSG; and a calculation manner used for calculating the scaling factor CSSF when the NCSG and a synchronization signal and physical broadcast channel block (SSB) measurement timing configuration (SMTC) overlap is the same as a calculation manner used for calculating the scaling factor CSSF when the NCSG and the SMTC do not overlap.

Based on the possible design, measurement behaviors within and outside the NCSG may be flexibly designed. In the first measurement behavior, it can be ensured that all MOs included in the first group of MOs can share a same measurement resource and a measurement delay is reduced, and it is ensured that L3 measurement and L1 measurement are normally performed. In addition, a calculation formula for calculating the scaling factor CSSF remains unchanged, to reduce the measurement delay.

In a possible design, the first group of MOs includes the third-type MO, and the third-type MO includes an MO requiring no MG and NCSG. Alternatively, the first group of MOs includes the second-type MO and the third-type MO, the second-type MO includes an MO requiring an NCSG, the third-type MO includes an MO requiring no MG and NCSG, and the terminal supports measurement of the second-type MO and the third-type MO within the NCSG.

Based on this possible design, in addition to a scenario in which the first group of MOs includes the third-type MO, the first measurement behavior may also be applicable to a scenario in which the first group of MOs includes the second-type MO and the third-type MO. This improves an applicable scenario of the first measurement behavior.

In a possible design, if the third-type MO includes a deactivated MO, the UE determines that measurement interruption provided for the deactivated MO is within a VIL of the NCSG. In this way, a radio frequency channel corresponding to the deactivated MO may be enabled/disabled by using the VIL of the NCSG, and no measurement interruption needs to be additionally provided. This does not affect MO measurement and saves measurement resources of the terminal.

In a possible design, the terminal determines that the measurement gap type corresponding to the first group of MOs is an NCSG; and an MO measured within the NCSG corresponds to a second measurement behavior, an MO measured outside the NCSG corresponds to a third measurement behavior, and the second measurement behavior is different from the third measurement behavior.

Based on the possible design, different measurement behaviors are used for different MOs during measurement within and outside the NCSG. This improves accuracy of MO measurement.

In a possible design, the second measurement behavior includes one or more of the following: a scaling factor CSSF corresponding to each MO within the NCSG is obtained according to a second calculation manner, and the second calculation manner is a calculation manner used for measurement within the MG; and a scaling factor Klayer1 for L1 measurement is determined based on a measurement period of a L1 measurement reference signal within the NCSG.

Based on this possible design, a measurement behavior corresponding to an MO within the NCSG is flexibly designed. In the second measurement behavior, it is ensured that MOs within the NCSG can share a same measurement resource, a measurement delay is reduced, and L1 measurement is normally performed.

In a possible design, the third measurement behavior includes one or more of the following: when the NCSG and an SMTC do not overlap, a scaling factor CSSF corresponding to each MO outside the NCSG is determined according to a calculation manner used for measurement outside the MG; when the NCSG and the SMTC do not overlap, a scaling factor Kp for L3 measurement is greater than 1; when the NCSG and the SMTC do not overlap, a scaling factor Klayer1 for L1 measurement is determined based on a measurement period of a L1 measurement reference signal outside the NCSG; and a calculation manner used for calculating the scaling factor CSSF when the NCSG and the SMTC overlap is a calculation manner within the MG, and the scaling factor Klayer1 for L1 measurement is determined based on a measurement period of a L1 measurement reference signal within the NCSG.

Based on this possible design, a measurement behavior corresponding to an MO outside the NCSG is flexibly designed. In the third measurement behavior, it is ensured that MOs outside the NCSG can share a same measurement resource, a measurement delay is reduced, and L1 measurement and L3 measurement are normally performed.

In a possible design, the first group of MOs includes the second-type MO and the third-type MO, the second-type MO is measured within the NCSG, and the third-type MO is measured outside the NCSG; and the second-type MO includes an MO requiring an NCSG, and the third-type MO includes an MO requiring no MG and NCSG.

Based on this possible design, the second measurement behavior may be applied to the second-type MO, and the third measurement behavior may be applied to the second-type MO. Different measurement behaviors are flexibly designed for different MOs, to ensure accuracy of MO measurement.

In a possible design, the first group of MOs includes the third-type MO, a deactivated MO in the third-type MO is measured within the NCSG, and an MO other than the deactivated MO in the third-type MO is measured outside the NCSG; and the third-type MO includes an MO requiring no MG and NCSG.

Based on this possible design, the second measurement behavior may be applied to the deactivated MO in the third-type MO, and the third measurement behavior may be applied to the MO other than the deactivated MO in the third-type MO. Different measurement behaviors are flexibly designed for different MOs in the third-type MO. This ensures accuracy of MO measurement, and at the same time does not additionally provide measurement interruption for the deactivated MO, and improves resource utilization.

In a possible design, the first group of MOs includes the second-type MO and the third-type MO, the second-type MO and a deactivated MO in the third-type MO are measured within the NCSG, and an MO other than the deactivated MO in the third-type MO is measured outside the NCSG; and the second-type MO includes an MO requiring an NCSG, and the third-type MO includes an MO requiring no MG and NCSG.

Based on this possible design, the second measurement behavior may be applied to the second-type MO and the deactivated MO in the third-type MO, and the third measurement behavior may be applied to the MO other than the deactivated MO in the third-type MO. Different measurement behaviors are flexibly designed for different MOs, to ensure accuracy of MO measurement. In addition, the deactivated MO is measured within the NCSG, to ensure that no measurement interruption is additionally provided for the deactivated MO, and to improve resource utilization.

In a possible design, the first group of MOs includes a deactivated secondary component carrier SCC, and the terminal determines that the measurement gap type corresponding to the first group of MOs is an NCSG; and that the terminal measures the first group of MOs based on the measurement gap type corresponding to the first group of MOs includes: The terminal determines, based on a parameter of the NCSG and attribute information of the deactivated SCC, a measurement behavior of the deactivated SCC; or the terminal determines, based on attribute information of the deactivated SCC, a measurement behavior of the deactivated SCC.

Based on this possible design, the terminal may determine, based on the parameter of the NCSG and the attribute information of the deactivated SCC, the measurement behavior of the deactivated SCC, or the terminal may determine, based on the attribute information of the deactivated SCC, the measurement behavior of the deactivated SCC.

In a possible design, the attribute information of the deactivated SCC includes an SMTC of the deactivated SCC; and that the terminal determines, based on a parameter of the NCSG and attribute information of the deactivated SCC, a measurement behavior of the deactivated SCC includes: If the NCSG and the SMTC of the deactivated SCC completely or partially overlap, the terminal measures the deactivated SCC within the NCSG; or if the NCSG and the SMTC of the deactivated SCC do not overlap, the terminal measures the deactivated SCC outside the NCSG.

Based on this possible design, when the attribute information of the deactivated SCC includes the SMTC of the deactivated SCC, the network device may control a measurement behavior of the terminal by controlling an overlapping relationship between the NCSG and the SMTC of the deactivated SCC (for example, performing measurement within the NCSG or performing measurement outside the NCSG). In this way, when the network device configures the NCSG, the NCSG does not need to completely cover the SMTC of the deactivated SCC, and the configuration is flexible and simple.

In a possible design, the attribute information of the deactivated SCC includes a measurement period; and that the terminal determines, based on attribute information of the deactivated SCC, a measurement behavior of the deactivated SCC includes: If the measurement period is greater than or equal to a first value, the terminal measures the deactivated SCC within the NCSG, where the NCSG and an SMTC of the deactivated SCC completely or partially overlap; or if the measurement period is less than a first value, the terminal measures the deactivated SCC outside the NCSG.

Based on this possible design, when the attribute information of the deactivated SCC includes the measurement period, the terminal may determine, based on whether the measurement period is greater than the first value, whether the terminal measures the deactivated SCC within the NCSG or measures the deactivated SCC outside the NCSG.

In a possible design, if the terminal measures the deactivated SCC within the NCSG, the deactivated SCC is calculated in a CSSF measured within the NCSG; or if the terminal measures the deactivated SCC outside the NCSG, the deactivated SCC is calculated in a CSSF measured outside the NCSG.

Based on this possible design, when the terminal measures the deactivated SCC within the NCSG, the terminal considers the deactivated SCC when calculating the CSSF measured within the NCSG; or when the terminal measures the deactivated SCC outside the NCSG, the terminal considers the deactivated SCC when calculating the CSSF measured outside the NCSG. In this way, the CSSF is more accurate.

In a possible design, if the terminal measures the deactivated SCC within the NCSG, no interruption occurs during measurement of the deactivated SCC; or if the terminal measures the deactivated SCC within the NCSG, no interruption occurs in an activated cell in a frequency band different from a frequency band in which the deactivated SCC is located during measurement of the deactivated SCC, but interruption occurs in an activated cell in a frequency band that is the same as the frequency band in which the deactivated SCC is located.

Based on this possible design, in one case, when the terminal measures the deactivated SCC within the NCSG, the terminal may include, within the VIL, interruption caused by measurement of the deactivated SCC. For example, within the VIL, the terminal enables a radio frequency chain corresponding to the deactivated SCC, or disables a radio frequency chain corresponding to the deactivated SCC. Therefore, no interruption occurs during measurement of the deactivated SCC. In another case, for the activated cell in the frequency band different from the frequency band in which the deactivated SCC is located, the terminal may include, within the VIL, interruption caused by measurement of the deactivated SCC. For example, within the VIL, the terminal enables a radio frequency chain corresponding to the deactivated SCC, or disables a radio frequency chain corresponding to the deactivated SCC. Therefore, no interruption occurs during measurement of the deactivated SCC. For the activated cell in the frequency band that is the same as the frequency band in which the deactivated SCC is located, in addition to enabling or disabling of the radio frequency chain affecting the activated cell in the same frequency band, the activated cell in the same frequency band may be affected by other reasons. For example, after the terminal enables the radio frequency chain, the activated cell in the same frequency band is also affected within a time period in which the terminal adjusts power. If the time period of power adjustment is not included within the VIL, interruption occurs in the activated cell in the same frequency band.

In a possible design, the method further includes: If the terminal has an independent beam management capability between a frequency band in which a first serving cell is located and a frequency band in which all measurement object frequencies within the NCSG are located, the terminal performs L1 measurement of the first serving cell within the NCSG; or if the terminal does not have an independent beam management capability between a frequency band in which a first serving cell is located and a frequency band in which any measurement object frequency within the NCSG is located, the terminal performs L1 measurement of the first serving cell outside the NCSG.

Based on the possible design, if the terminal has the independent beam management capability between the frequency band in which the first serving cell is located and the frequency band in which all the measurement object frequencies within the NCSG are located, measurement (that is, L3 measurement of the measurement object frequency) performed by the terminal on the measurement object frequency does not affect L1 measurement of the first serving cell, or L1 measurement of the first serving cell is not affected by L3 measurement of the measurement object frequency. Therefore, the terminal may perform L1 measurement of the first serving cell within the NCSG. Compared with an MG measurement manner, impact of L3 measurement of the measurement object frequency on L1 measurement of the first serving cell is reduced, an opportunity of L1 measurement is increased, and an L1 measurement delay is reduced.

According to a second aspect, this application provides a communication apparatus. The communication apparatus may be a terminal, a chip in a terminal, or a system-on-a- chip, or may be a functional module that is in the communication apparatus and that is configured to implement the method according to any one of the first aspect or the possible designs of the first aspect. The communication apparatus may implement functions performed by the communication apparatus in the foregoing aspects or the possible designs, and the functions may be implemented by hardware executing corresponding software. The hardware or the software includes one or more modules corresponding to the functions. For example, the communication apparatus may include a processing unit and a sending unit.

The processing unit is configured to: determine a measurement gap type corresponding to a first group of MOs, where the measurement gap type includes an MG or an NCSG; control, based on the measurement gap type corresponding to the first group of MOs, the sending unit to measure the first group of MOs; and determine a data transmission behavior in a serving cell of the terminal based on the measurement gap type corresponding to the first group of MOs.

For a specific implementation of the communication apparatus, refer to behavior functions of the terminal in the measurement method according to any one of the first aspect or the possible designs of the first aspect. Details are not described herein again. Therefore, the terminal provided in the second aspect achieves same beneficial effects as any one of the first aspect or the possible designs of the first aspect.

According to a third aspect, a communication apparatus is provided. The communication apparatus may be a terminal, or a chip or a system-on-a-chip in the terminal. The communication apparatus may implement functions performed by the terminal in the foregoing aspects or the possible designs, and the functions may be implemented by hardware. In a possible design, the communication apparatus may include a processor and a communication interface. The processor may be configured to support the communication apparatus in implementing a function in any one of the first aspect or the possible designs of the first aspect. For example, the processor is configured to: determine a measurement gap type corresponding to a first group of MOs, where the measurement gap type includes an MG or an NCSG; measure the first group of MOs based on the measurement gap type corresponding to the first group of MOs; and determine a data transmission behavior in a serving cell of the terminal based on the measurement gap type corresponding to the first group of MOs. In another possible design, the communication apparatus may further include a memory. The memory is configured to store computer-executable instructions and data that are necessary for the communication apparatus. When the communication apparatus runs, the processor executes the computer-executable instructions stored in the memory, so that the communication apparatus performs the measurement method according to any one of the first aspect or the possible designs of the first aspect.

According to a fourth aspect, a computer-readable storage medium is provided. The computer-readable storage medium may be a readable non-volatile storage medium. The computer-readable storage medium stores instructions. When the instructions are run on a computer, the computer is enabled to perform the measurement method according to any one of the first aspect or the possible designs of the foregoing aspects.

According to a fifth aspect, a computer program product is provided, including instructions. When the instructions are run on a computer, the computer is enabled to perform the measurement method according to any one of the first aspect or the possible designs of the foregoing aspects.

According to a sixth aspect, a communication apparatus is provided. The communication apparatus may be a terminal, a chip in a terminal, or a system-on-a-chip. The communication apparatus includes one or more processors and one or more memories. The one or more memories are coupled to the one or more processors. The one or more memories are configured to store computer program code. The computer program code includes computer instructions. When the one or more processors execute the computer instructions, the communication apparatus is enabled to perform the measurement method according to any one of the first aspect or the possible designs of the first aspect.

For technical effects achieved by any one of the designs of the third aspect to the sixth aspect, refer to the technical effects achieved by any one of the first aspect or the possible designs of the first aspect. Details are not described again.

According to a seventh aspect, a measurement method is provided. The method is applied to a network device, and the method includes: The network device determines a measurement gap type corresponding to a first group of MOs, where the measurement gap type includes a measurement gap MG or an NCSG; and the network device performs data scheduling on a terminal based on the measurement gap type corresponding to the first group of MOs.

In a possible design, the network device determines that the measurement gap type corresponding to the first group of MOs is an NCSG, and the network device determines a parameter of the NCSG based on a parameter of an MG pattern configured by the network device for the first group of MOs.

Based on this possible design, the parameter of the NCSG is determined based on the parameter of the configured MG pattern. In this way, a system design is simplified and the NCSG pattern does not need to be maintained. This reduces complexity of the NCSG configuration.

In a possible design, the method further includes: The network device sends first information to the terminal. The first information is used for determining the measurement gap type corresponding to the first group of MOs.

Based on this possible design, the network device may indicate, to the terminal, the measurement gap type corresponding to the first group of MOs. This simplifies the system design, and reduces complexity of determining the measurement gap type by the terminal.

For a design form and a bearer manner of the first information, refer to the description in the first aspect. Details are not described again.

Parameters of the NCSG include a first VIL, an ML, and a second VIL. Specifically, for a process in which the network device determines the parameter of the NCSG based on the parameter of the MG pattern configured by the network device for the first group of MOs, refer to the process in which the terminal determines the parameter of the NCSG based on the parameter of the MG pattern in the possible design of the first aspect. Details are not described again.

For related descriptions of the first VIL, the ML, and the second VIL, refer to the descriptions in the first aspect. Details are not described again.

In a possible design, the data scheduling includes uplink data scheduling, and the network device performs data scheduling on a terminal based on the measurement gap type corresponding to the first group of MOs includes: The network device generates scheduling information, and sends the scheduling information to the terminal. The scheduling information is used for scheduling the terminal to perform uplink transmission after n slots or symbols after the first VIL end, and for scheduling the terminal to perform uplink transmission after n slots or symbols after the second VIL end, where n is an integer greater than or equal to 0, and n is predefined in a protocol or is determined based on a communication parameter of the terminal.

Based on this possible design, the network device may schedule the terminal to perform uplink transmission after the n slots or symbols after the first VIL end, and uplink transmission of the terminal is not affected. In addition, this avoids a problem that the network device schedules the terminal to perform uplink transmission in the n slots or symbols after the first VIL, but the terminal does not perform uplink transmission in this time period based on internal implementation. As a result, uplink transmission scheduling fails and power consumption of the network device is caused.

In a possible design, the method further includes: The network device receives third information from the terminal. The third information indicates whether the terminal supports measurement of a third-type MO within the ML of the NCSG.

Based on the possible design, the network device may learn of a measurement capability of the terminal within the ML of the NCSG based on the third information. In this way, the network device determines a measurement delay of the terminal based on the third information. For example, the network device may estimate the measurement delay of the terminal based on the third information, and adjust the configuration of the MO or the MG based on a requirement of the network device for the measurement delay.

In a possible design, the terminal determines that the measurement gap type corresponding to the first group of MOs is an NCSG, an MO measured within the NCSG and an MO measured outside the NCSG correspond to a first measurement behavior.

Based on the possible design, it is ensured that measurement behaviors of to-be-measured MOs within and outside the NCSG are consistent. In this way, the terminal does not consider the NCSG as a special measurement opportunity for measuring a part of MOs during measurement, and does not consider the NCSG as an unavailable measurement opportunity.

In a possible design, the first measurement behavior includes one or more of the following: a scaling factor CSSF corresponding to each MO is obtained according to a first calculation manner, and the first calculation manner is a calculation manner used for measurement outside the MG; a scaling factor Kp for L3 measurement is equal to 1; a scaling factor Klayer1 for L1 measurement is determined based on measurement periods of all L1 measurement reference signals within and outside the NCSG; and a calculation manner used for calculating the scaling factor CSSF when the NCSG and a synchronization signal and physical broadcast channel block (SSB) measurement timing configuration (SMTC) overlap is the same as a calculation manner used for calculating the scaling factor CSSF when the NCSG and the SMTC do not overlap.

Based on the possible design, measurement behaviors within and outside the NCSG may be flexibly designed. In the first measurement behavior, it can be ensured that all MOs included in the first group of MOs can share a same measurement resource and a measurement delay is reduced, and it is ensured that L3 measurement and L1 measurement are normally performed. In addition, a calculation formula for calculating the scaling factor CSSF remains unchanged, to reduce the measurement delay.

In a possible design, the first group of MOs includes the third-type MO, and the third-type MO includes an MO requiring no MG and NCSG. Alternatively, the first group of MOs includes the second-type MO and the third-type MO, the second-type MO includes an MO requiring an NCSG, the third-type MO includes an MO requiring no MG and NCSG, and the terminal supports measurement of the second-type MO and the third-type MO within the NCSG.

Based on this possible design, in addition to a scenario in which the first group of MOs includes the third-type MO, the first measurement behavior may also be applicable to a scenario in which the first group of MOs includes the second-type MO and the third-type MO. This improves an applicable scenario of the first measurement behavior.

In a possible design, if the third-type MO includes a deactivated MO, the UE determines that measurement interruption provided for the deactivated MO is within a VIL of the NCSG. In this way, a radio frequency channel corresponding to the deactivated MO may be enabled/disabled by using the VIL of the NCSG, and no measurement interruption needs to be additionally provided. This does not affect MO measurement and saves measurement resources of the terminal.

In a possible design, the terminal determines that the measurement gap type corresponding to the first group of MOs is an NCSG; and an MO measured within the NCSG corresponds to a second measurement behavior, an MO measured outside the NCSG corresponds to a third measurement behavior, and the second measurement behavior is different from the third measurement behavior.

Based on the possible design, different measurement behaviors are used for different MOs during measurement within and outside the NCSG. This improves accuracy of MO measurement.

In a possible design, the second measurement behavior includes one or more of the following: a scaling factor CSSF corresponding to each MO within the NCSG is obtained according to a second calculation manner, and the second calculation manner is a calculation manner used for measurement within the MG; and a scaling factor Klayer1 for L1 measurement is determined based on a measurement period of a L1 measurement reference signal within the NCSG.

Based on this possible design, a measurement behavior corresponding to an MO within the NCSG is flexibly designed. In the second measurement behavior, it is ensured that MOs within the NCSG can share a same measurement resource, a measurement delay is reduced, and L1 measurement is normally performed.

In a possible design, the third measurement behavior includes one or more of the following: when the NCSG and an SMTC do not overlap, a scaling factor CSSF corresponding to each MO outside the NCSG is determined according to a calculation manner used for measurement outside the MG; when the NCSG and the SMTC do not overlap, a scaling factor Kp for L3 measurement is greater than 1; when the NCSG and the SMTC do not overlap, a scaling factor Klayer1 for L1 measurement is determined based on a measurement period of a L1 measurement reference signal outside the NCSG; and a calculation manner used for calculating the scaling factor CSSF when the NCSG and the SMTC overlap is a calculation manner within the MG, and the scaling factor Klayer1 for L1 measurement is determined based on a measurement period of a L1 measurement reference signal within the NCSG.

Based on this possible design, a measurement behavior corresponding to an MO outside the NCSG is flexibly designed. In the third measurement behavior, it is ensured that MOs outside the NCSG can share a same measurement resource, a measurement delay is reduced, and L1 measurement and L3 measurement are normally performed.

In a possible design, the first group of MOs includes the second-type MO and the third-type MO, the second-type MO is measured within the NCSG, and the third-type MO is measured outside the NCSG; and the second-type MO includes an MO requiring an NCSG, and the third-type MO includes an MO requiring no MG and NCSG.

Based on this possible design, the second measurement behavior may be applied to the second-type MO, and the third measurement behavior may be applied to the second-type MO. Different measurement behaviors are flexibly designed for different MOs, to ensure accuracy of MO measurement.

In a possible design, the first group of MOs includes the third-type MO, a deactivated MO in the third-type MO is measured within the NCSG, and an MO other than the deactivated MO in the third-type MO is measured outside the NCSG; and the third-type MO includes an MO requiring no MG and NCSG.

Based on this possible design, the second measurement behavior may be applied to the deactivated MO in the third-type MO, and the third measurement behavior may be applied to the MO other than the deactivated MO in the third-type MO. Different measurement behaviors are flexibly designed for different MOs in the third-type MO. This ensures accuracy of MO measurement, and at the same time does not additionally provide measurement interruption for the deactivated MO, and improves resource utilization.

In a possible design, the first group of MOs includes the second-type MO and the third-type MO, the second-type MO and a deactivated MO in the third-type MO are measured within the NCSG, and an MO other than the deactivated MO in the third-type MO is measured outside the NCSG; and the second-type MO includes an MO requiring an NCSG, and the third-type MO includes an MO requiring no MG and NCSG.

Based on this possible design, the second measurement behavior may be applied to the second-type MO and the deactivated MO in the third-type MO, and the third measurement behavior may be applied to the MO other than the deactivated MO in the third-type MO. Different measurement behaviors are flexibly designed for different MOs, to ensure accuracy of MO measurement. In addition, the deactivated MO is measured within the NCSG, to ensure that no measurement interruption is additionally provided for the deactivated MO, and to improve resource utilization.

According to an eighth aspect, this application provides a communication apparatus. The communication apparatus may be a network device, a chip in a network device, or a system-on-a-chip, or may be a functional module that is in the network device and that is configured to implement the method according to any one of the seventh aspect or the possible designs of the seventh aspect. The communication apparatus may implement functions performed by the network device in the foregoing aspects or the possible designs, and the functions may be implemented by hardware executing corresponding software. The hardware or the software includes one or more modules corresponding to the functions. For example, the communication apparatus may include a processing unit and a sending unit.

The processing unit is configured to determine a measurement gap type corresponding to a first group of MOs. The measurement gap type includes a measurement gap MG or an NCSG.

The processing unit is further configured to control, based on the measurement gap type corresponding to the first group of MOs, the sending unit to perform data scheduling on a terminal.

For a specific implementation of the communication apparatus, refer to behavior functions of the network device in the measurement method according to any one of the seventh aspect or the possible designs of the seventh aspect. Details are not described herein again. Therefore, the communication apparatus provided in the eighth aspect achieves same beneficial effects as any one of the seventh aspect or the possible designs of the seventh aspect.

According to a ninth aspect, a communication apparatus is provided. The communication apparatus may be a network device, or a chip or a system-on-a-chip in the network device. The communication apparatus may implement functions performed by the network device in the foregoing aspects or the possible designs, and the functions may be implemented by hardware. In a possible design, the communication apparatus may include a processor and a communication interface. The processor may be configured to support the communication apparatus in implementing a function in any one of the seventh aspect or the possible designs of the seventh aspect. For example, the processor is configured to: determine a measurement gap type corresponding to a first group of MOs, where the measurement gap type includes a measurement gap MG or an NCSG; and control, based on the measurement gap type corresponding to the first group of MOs, a sending unit to perform data scheduling on a terminal. In another possible design, the communication apparatus further includes a memory. The memory is configured to store computer-executable instructions and data that are necessary for the communication apparatus. When the communication apparatus runs, the processor executes the computer-executable instructions stored in the memory, so that the communication apparatus performs the measurement method according to any one of the seventh aspect or the possible designs of the seventh aspect.

According to a tenth aspect, a computer-readable storage medium is provided. The computer-readable storage medium may be a readable non-volatile storage medium. The computer-readable storage medium stores instructions. When the instructions are run on a computer, the computer is enabled to perform the measurement method according to any one of the seventh aspect or the possible designs of the foregoing aspects.

According to an eleventh aspect, a computer program product is provided, including instructions. When the instructions are run on a computer, the computer is enabled to perform the measurement method according to any one of the seventh aspect or the possible designs of the foregoing aspects.

According to a twelfth aspect, a communication apparatus is provided. The communication apparatus is a network device, a chip in a network device, or a system-on-a-chip. The communication apparatus includes one or more processors and one or more memories. The one or more memories are coupled to the one or more processors. The one or more memories are configured to store computer program code. The computer program code includes computer instructions. When the one or more processors execute the computer instructions, the communication apparatus is enabled to perform the measurement method according to any one of the seventh aspect or the possible designs of the seventh aspect.

For technical effects achieved by any one of the designs of the ninth aspect to the twelfth aspect, refer to the technical effects achieved by any one of the seventh aspect or the possible designs of the seventh aspect. Details are not described again.

According to a thirteenth aspect, an embodiment of this application provides a communication system. The communication system may include the communication apparatus according to either the second aspect or the sixth aspect, and include the communication apparatus according to either the eighth aspect or the twelfth aspect.

DETAILED DESCRIPTION OF ILLUSTRATIVE EMBODIMENTS

Before embodiments of this application are described, some terms in embodiments of this application are explained.

MG: To measure a reference signal on a specific MO, a terminal tunes a radio frequency of a serving cell to a radio frequency of the MO, receives the reference signal on the radio frequency of the MO, measures the received reference signal, and tunes the radio frequency of the MO back to the radio frequency of the serving cell after the measurement is completed. In a time period in which the radio frequency of the serving cell is tuned to the radio frequency of the MO, measurement is performed on the radio frequency of the MO, and the radio frequency of the MO is tuned back to the serving cell, the radio frequency of the serving cell is in an off state, and data interruption occurs in the serving cell. The time period may be referred to as an interruption time or an MG.

In this embodiment of this application, the serving cell may be a cell that provides a service (for example, uplink/downlink transmission) for the terminal. If the terminal is in a radio resource control (RRC) connected mode, but carrier aggregation (CA) is not configured, the terminal has only one serving cell, that is, a primary cell (PCell). If the terminal is in an RRC connected mode and CA is configured, a serving cell set of the terminal includes a PCell and all secondary cells (SCell).

Figure 1:
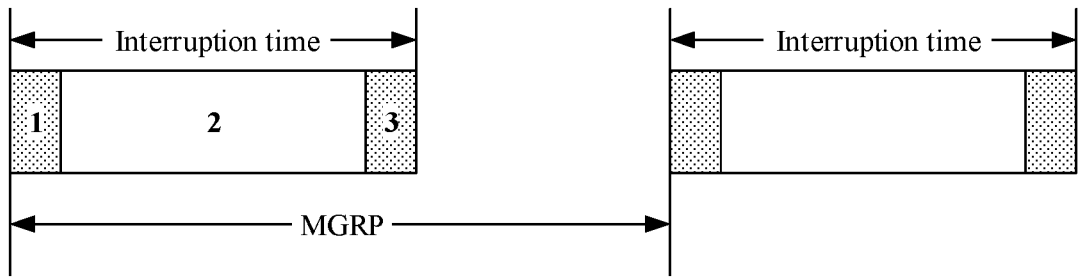
FIG. 1 is a schematic diagram of an MG.

For example, FIG. 1 is a schematic diagram of an MG. As shown in FIG. 1, a time length of an MG may be referred to as an MGL or an interruption time, and a time gap between adjacent MGs may be referred to as an MGRP. Optionally, as shown in FIG. 1, the MG may include a radio frequency adjustment time (part 1) before measurement, a measurement time (part 2), and a radio frequency adjustment time (part 3) after measurement. In this time period, data interruption occurs in a serving cell.

Parameters of the MG may include an MGL, an MGRP, and time domain location information. The time domain location information may indicate a start location at which data interruption occurs in the serving cell. The parameters of the MG may be configured by a network device. The 3GPP standard protocol defines 26 MG patterns. Numbers of the 26 MG patterns are gap (GP) #0 to GP #25. Each MG pattern corresponds to a group of parameters of the MG. Values of parameters corresponding to different MG patterns may be different.

It should be noted that naming of the MG and each parameter of the MG is not limited in this application, and the MG may alternatively be named as a full gap (full gap) or may have other names. This is not limited.

To reduce impact of the MG on a data throughput of the serving cell, an NCSG is proposed in the 3GPP R17 MG enhancement project. For example, a plurality of radio frequency chains are configured on the terminal. When measuring a reference signal on a specific MO, the terminal enables a radio frequency chain corresponding to the MO, receives the reference signal on a radio frequency of the MO, measures the received reference signal, and disables the radio frequency chain corresponding to the MO after the measurement is completed, and does not need to tune a radio frequency of a serving cell to the radio frequency of the MO. A time period in which the terminal enables the radio frequency chain corresponding to the MO, performs measurement on the radio frequency of the MO, and disables the radio frequency chain corresponding to the MO may be referred to as an NCSG. Because the plurality of radio frequency chains on the terminal share a same switch control apparatus, enabling or disabling of the radio frequency chain corresponding to the MO may affect the enabling or disabling of the radio frequency chain corresponding to the serving cell. As a result, data interruption occurs in the serving cell.

Figure 2:
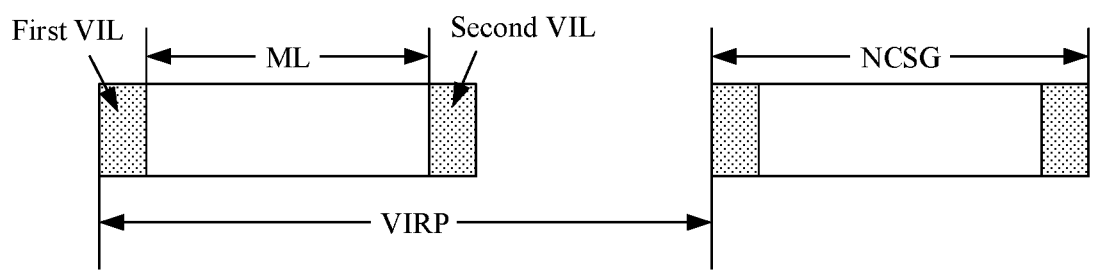
FIG. 2 is a schematic diagram of an NCSG.

For example, FIG. 2 is a schematic diagram of an NCSG. As shown in FIG. 2, an NCSG may include a first VIL, an ML, and a second VIL, and a time gap between adjacent NCSGs may be referred to as a VIRP. The first VIL may be a time length for a terminal to enable a radio frequency chain corresponding to an MO, the second VIL may be a time length for the terminal to disable the radio frequency chain corresponding to the MO, the ML may be a time length for the terminal to perform RRM measurement by using the radio frequency chain corresponding to the MO, and data in a serving cell of the terminal within the ML is not interrupted.

In this embodiment of this application, the first VIL may be a time period in which the radio frequency chain corresponding to the MO is enabled within the NCSG, and the second VIL may be a time period in which the radio frequency chain corresponding to the MO is disabled within the NCSG. In this application, naming of the first VIL and the second VIL is not limited. The first VIL may be alternatively described as a previous VIL, and the second VIL may be alternatively described as a later VIL.

Parameters of the NCSG may include a VIL, an ML, and a VIRP, and a value of each parameter may be preconfigured. For example, the 3GPP long term evolution (LTE) standard protocol defines four NCSG patterns: #0 to #3, and the four NCSG pattern identifiers (ID) may be 0, 1, 2, and 3. Each NCSG pattern corresponds to a group of parameters of the NCSG, and values of parameters corresponding to different NCSG patterns may be different.

For example, the first VIL is a VIL 1, and the second VIL is a VIL 2. The following Table 1 shows four NCSG patterns. As shown in Table 1, values of parameters of each NCSG pattern are different. For example, when the NCSG pattern ID is 0, the VIL 1 is 1 ms, and the ML is 4 ms. When a scheduling mode is downlink (DL) scheduling (or downlink data scheduling for short), the VIL 2 is 1 ms. When the scheduling mode is uplink (UL) scheduling (or uplink data scheduling for short), the VIL 2 is 2 ms, and the VIRP is 40 ms. When the NCSG pattern ID is 1, the VIL 1 is 1 ms, and the ML is 4 ms. When the scheduling mode is downlink data scheduling, the VIL 2 is 1 ms. When the scheduling mode is uplink data scheduling, the VIL 2 is 2 ms, and VIRP is 80 ms.

TABLE 1

| NCSG pattern ID | VIL 1 (ms) | ML (ms) | VIL 2 (ms) | VIRP (ms) |
| --- | --- | --- | --- | --- |
| 0 | 1 | 4 | DL: 1<br>UL: 2 | 40 |
| 1 | 1 | 4 | DL: 1<br>UL: 2 | 80 |
| 2 | 2 | 3 | 2 | 40 |
| 3 | 2 | 3 | 2 | 80 |

In a possible design, a network device configures an NCSG pattern or an MG pattern for a specific MO or a group of MOs of the terminal, and the terminal performs RRM measurement on the MO based on a parameter corresponding to the configured NCSG pattern or MG pattern. For example, it is assumed that the terminal supports a CA technology and a synchronous dual connectivity (DC) technology. In synchronous DC, if an MG pattern is not configured for the terminal, the network device may configure an NCSG per UE, and a same NCSG is configured on each component carrier (CC). If an MG pattern, that is GP #0 or GP #1, is configured for the terminal on a part of CCs, an NCSG pattern 0 or an NCSG pattern 1 may be implicitly configured on another CC. If an MG is configured for the terminal on all CCs, an NCSG cannot be configured.

In asynchronous DC, if no MG is configured for the terminal in a master cell group (MCG) and a secondary cell group (SCG), the network device may configure an NCSG per CC. If an MG pattern, that is GP #0 or GP #1, is configured for the terminal in the MCG (or the SCG), and no MG is configured in the SCG (or the MCG), an NCSG pattern 2/NCSG pattern 3 may be implicitly configured in the SCG (or the MCG).

In the foregoing possible design, the network device may need to configure both an NCSG pattern and an MG pattern for the terminal for different MOs. A configuration manner is complex and not flexible, and a plurality of NCSG patterns and a plurality of MG patterns need to be maintained. In addition, flexible switching between NCSG patterns or MG patterns cannot be implemented, and a measurement behavior within the ML of the NCSG is not standardized.

To resolve the foregoing technical problem, an embodiment of this application provides a measurement method. The method includes: A terminal determines a measurement gap type corresponding to a first group of MOs, where the measurement gap type includes an MG or an NCSG; and the terminal measures the first group of MOs based on the determined measurement gap type corresponding to the first group of MOs, and determines a data transmission behavior in a serving cell of the terminal based on the measurement gap type corresponding to the first group of MOs. To be specific, for a group of MOs, a measurement gap type used by the group of MOs is determined, so that a parameter of the NCSG is determined and measurement is performed based on the determined measurement gap type, and there is no need to allocate an NCSG pattern to each MO that is in the group of MOs and that requires an NCSG. This reduces complexity of a measurement gap configuration.

The following describes the measurement method provided in embodiments of this application with reference to the accompanying drawings in this specification.

The measurement method provided in embodiments of this application may be applied to any one of a 4th generation (4G) system, an LTE system, a 5th generation (5G) system, a new radio (NR) system, a new radio-vehicle-to-everything communication (NR-V2X) system, or an internet of things system, or may be applied to another next generation communication system. This is not limited. The following uses the communication system shown in FIG. 3 as an example to describe the measurement method provided in embodiments of this application.

Figure 3:
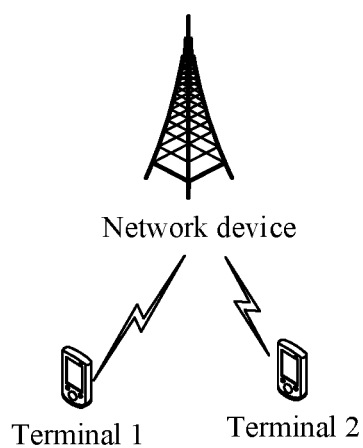
FIG. 3 is a simplified schematic diagram of a communication system according to an embodiment of this application.

FIG. 3 is a schematic diagram of a communication system according to an embodiment of this application. As shown in FIG. 3, the communication system may include a network device and a plurality of terminals, for example, a terminal 1 and a terminal 2. In the system shown in FIG. 3, the terminal may be in an RRC connected mode, and the terminal may support a CA technology and a DC technology. It should be noted that FIG. 3 is an example framework diagram. A quantity of nodes included in FIG. 3 is not limited. In addition to the functional nodes shown in FIG. 3, another node may be further included, for example, a core network device, a gateway device, or an application server. This is not limited. In addition, the network device may include a access network device, or may include a core network device, or may include a device (for example, a server) of a service provider, or the like. This is not limited. In this embodiment of this application, an example in which the network device includes an access network device is used for description.

The network device is mainly configured to implement functions such as resource scheduling, radio resource management, and radio access control of the terminal. Specifically, the network device may be any node in a small base station, a wireless access point, a transmission reception point (TRP), a transmission point (TP), or another access node.

The terminal may be terminal equipment, user equipment (UE), a mobile station (MS), a mobile terminal (MT), or the like. Specifically, the terminal may be a mobile phone, a tablet computer, or a computer with a wireless transceiver function, or may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a smart home, a vehicle-mounted terminal, or the like. In embodiments of this application, an apparatus configured to implement a function of the terminal may be a terminal, or may be an apparatus that can support the terminal in implementing the function, for example, a chip system (for example, a processing system including one chip or a plurality of chips). The following describes the measurement method provided in embodiments of this application by using an example in which an apparatus for implementing a function of the terminal is a terminal.

Figure 4:
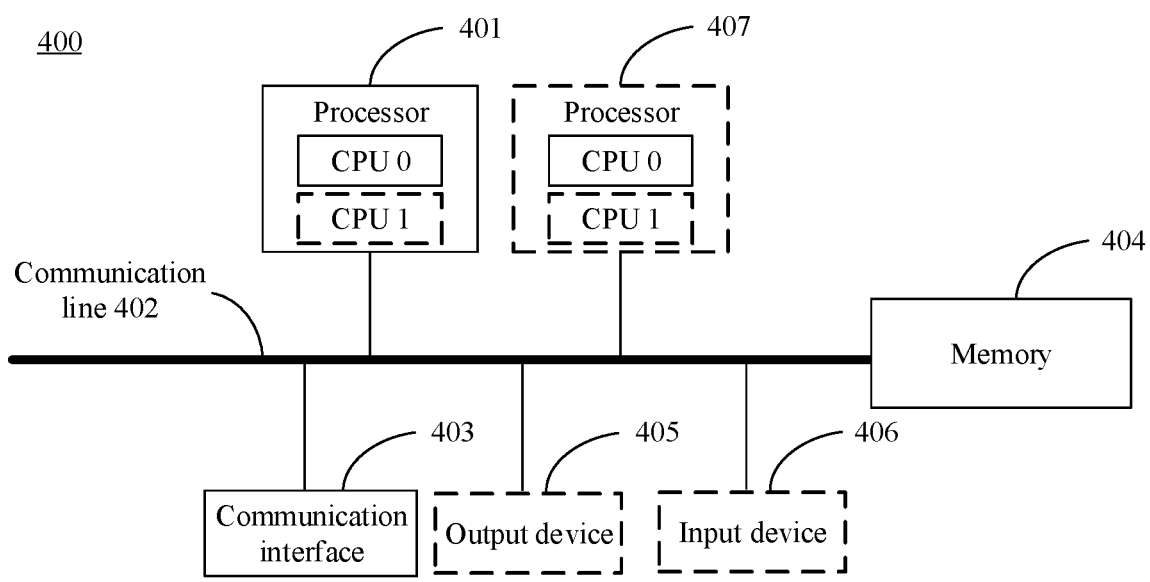
FIG. 4 is a schematic diagram of a communication apparatus according to an embodiment of this application.

During specific implementation, network elements shown in FIG. 3, for example, the terminal and the network device, may use a composition structure shown in FIG. 4 or include components shown in FIG. 4. FIG. 4 is a schematic diagram of a composition of a communication apparatus 400 according to an embodiment of this application. When the communication apparatus 400 has a function of the terminal in embodiments of this application, the communication apparatus 400 may be a terminal, a chip in a terminal, or a system-on-a-chip. When the communication apparatus 400 has the functions of the network device in embodiments of this application, the communication apparatus 400 may be a network device, or a chip or a system-on-a-chip in the network device.

As shown in FIG. 4, the communication apparatus 400 may include a processor 401, a communication line 402, and a communication interface 403. Further, the communication apparatus 400 may include a memory 404. The processor 401, the memory 404, and the communication interface 403 may be connected to each other through the communication line 402.

The processor 401 may be a central processing unit (CPU), a general-purpose processor, a network processor (NP), a digital signal processor (DSP), a microprocessor, a microcontroller, a programmable logic device (PLD), or any combination thereof. The processor 401 may alternatively be any other apparatus having a processing function, for example, a circuit, a component, or a software module.

The communication line 402 is configured to transmit information between the components included in the communication apparatus 400.

The communication interface 403 is configured to communicate with another device or another communication network. The another communication network may be an Ethernet, a radio access network (RAN), a wireless local area network (WLAN), or the like. The communication interface 403 may be a radio frequency module, a transceiver, or any apparatus that can implement communication. In this embodiment of this application, an example in which the communication interface 403 is a radio frequency module is used for description. The radio frequency module may include an antenna, a radio frequency circuit, and the like. The radio frequency circuit may include a radio frequency integrated chip, a power amplifier, and the like.

The memory 404 is configured to store instructions. The instructions may be a computer program.

The memory 404 may be a read-only memory (ROM) or another type of static storage device that can store static information and/or instructions, or may be a random access memory (RAM) or another type of dynamic storage device that can store information and/or instructions, or may be an electrically erasable programmable read-only memory (EEPROM), a compact disc read-only memory (CD-ROM) or other optical disk storage, optical disc storage, or a magnetic disk storage medium or another magnetic storage device. The optical disc storage includes a compact disc, a laser disc, an optical disc, a digital versatile disc, a Blu-ray disc, and the like.

It should be noted that the memory 404 may exist independently of the processor 401, or may be integrated into the processor 401. The memory 404 may be configured to store instructions, program code, some data, or the like. The memory 404 may be located inside the communication apparatus 400, or may be located outside the communication apparatus 400. This is not limited. The processor 401 is configured to execute the instructions stored in the memory 404, to implement a measurement method provided in the following embodiments of this application.

In an example, the processor 401 may include one or more CPUs, for example, a CPU 0 and a CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. The input device 406 is a keyboard, a mouse, a microphone, a joystick, or the like, and the output device 405 is a display screen, a loudspeaker (speaker), or the like.

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communication apparatus. In addition to the components shown in FIG. 4, the communication apparatus may include more or fewer components than those shown in the figure, or some components may be combined, or different component arrangements may be used.

In this embodiment of this application, the chip system may include a chip, or may include a chip and another discrete component.

The following describes the measurement method provided in embodiments of this application with reference to the communication system shown in FIG. 3. Devices in the following embodiments may have the components shown in FIG. 4, and actions, terms, and the like involved in embodiments may be mutually referenced. Names of messages exchanged between devices, names of parameters in messages, and the like in embodiments are merely examples. Another name may alternatively be used during specific implementation. This is not limited.

Figure 5:
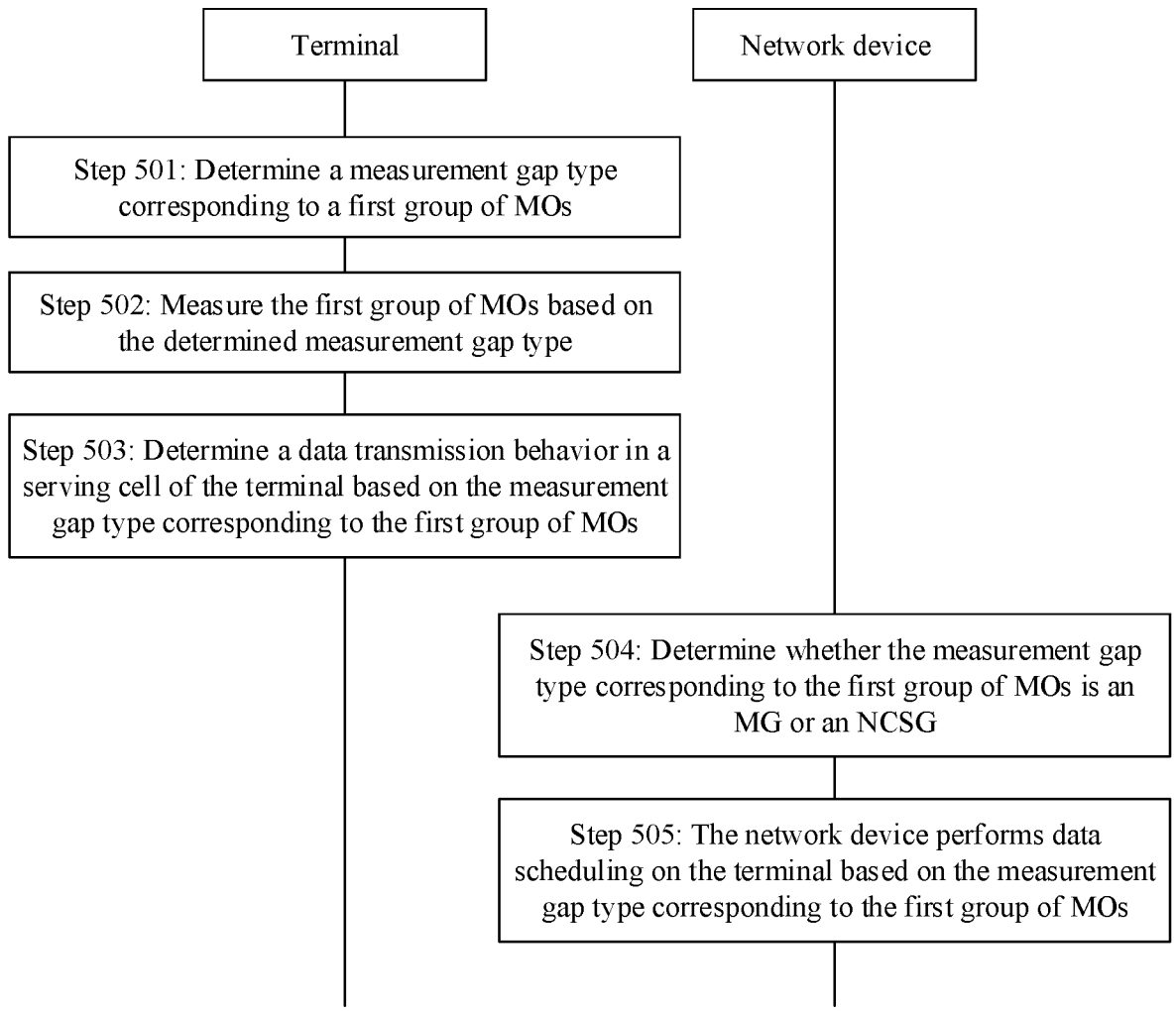
FIG. 5 is a flowchart of a measurement method according to an embodiment of this application.

FIG. 5 is a measurement method according to an embodiment of this application. As shown in FIG. 5, the method may include the following steps.

Step 501: A terminal determines a measurement gap type corresponding to a first group of MOs, where the measurement gap type is an MG or an NCSG.

The terminal may be any terminal in the communication system shown in FIG. 3.

The terminal may perform uplink transmission or downlink transmission with a network device in a serving cell. For a specific description of the serving cell, refer to the foregoing description. Details are not described again.

The first group of MOs may be configured by the network device for the terminal, the first group of MOs may include one or more MOs, and the MO may include a frequency of a serving cell or a frequency of a non-serving cell of the terminal. In an example, the first group of MOs may include all MOs of the terminal, that is, the MG or NCSG corresponding to the first group of MOs is per UE. In another example, the first group of MOs may include all MOs in a specific frequency range (frequency range, FR) supported by the terminal, that is, the MG or NCSG corresponding to the first group of MOs is per FR. The FR supported by the terminal may include a first FR or a second FR. The first FR may be a low frequency range FR1, and the second FR may be a high frequency range FR2. It should be understood that a manner of grouping the MOs is not limited in this embodiment of this application.

For example, the terminal may determine, based on an instruction of the network device, whether the measurement gap type corresponding to the first group of MOs is an MG or an NCSG. For example, the terminal may receive first information from the network device, where the first information is used for determining the measurement gap type corresponding to the first group of MOs, and the terminal determines, based on the first information, the measurement gap type corresponding to the first group of MOs.

In a possible design, the first information indicates the measurement gap type corresponding to the first group of MOs. For example, the first information may carry an indicator indicating whether the measurement gap type corresponding to the first group of MOs is an MG or an NCSG. After receiving the first information, the terminal may directly determine, based on the first information, whether the measurement gap type corresponding to the first group of MOs is an MG or an NCSG.

Specifically, the first information may be a binary bit "o" or "1". When the first information is a binary bit "0", it indicates that the measurement gap type is an MG. When the first information is a binary bit "1", it indicates that the measurement gap type is an NCSG.

In this possible design, the first information may be carried in second information, and the second information may be used for configuring an MG pattern for the first group of MOs of the terminal. When the first group of MOs includes all MOs of the terminal, the MG pattern may be an MG pattern configured at a granularity of the terminal, that is, an MG pattern per UE; or when the first group of MOs includes an MO corresponding to a specific FR supported by the terminal, the MG pattern may be an MG pattern configured at a granularity of the FR supported by the terminal, that is, an MG pattern per FR, and the MG pattern may correspond to the FR1 or the FR2. Specifically, the second information may be referred to as MG pattern configuration information, and the first information is carried in the second information, so that the network device may additionally indicate whether the measurement gap type corresponding to the first group of MOs is an MG or an NCSG while configuring the MG pattern corresponding to the first group of MOs for the terminal. This reduces signaling overheads.

Alternatively, in this possible design, the first information may be further carried in new signaling, for example, carried in layer (layer, L) 1 signaling or L2 signaling, that is, dedicated signaling indicating whether the measurement gap type corresponding to the first group of MOs is an MG or an NCSG. In this way, the terminal can accurately learn of the measurement gap type corresponding to the first group of MOs in time.

In this embodiment of this application, for a manner in which the network device configures the MG pattern for the first group of MOs of the terminal, refer to the following description. For example, the terminal may report capability information (for example, whether the terminal requires an MG) to the network device, and the network device may send, to the terminal based on the capability information reported by the terminal, second information (for example, MG pattern configuration information) that carries the MG pattern.

For the MG pattern per UE, the MG pattern configured by the network device for the first group of MOs of the terminal may be any one of the foregoing GP #0 to GP #25. For the MG pattern per FR, and the MG pattern corresponding to the FR1, the MG pattern configured by the network device for the first group of MOs of the terminal may be any one of GP #0 to GP #11, GP #24, and GP #/25. For the MG pattern per UE, and the MG pattern corresponding to the FR2, the MG pattern configured by the network device for the first group of MOs of the terminal may be any one of GP #12 to GP #23.

In another possible design, the first information indicates whether the terminal is allowed to switch the measurement gap type, and that the terminal determines, based on the first information, the measurement gap type corresponding to the first group of MOs may include:

The terminal determines, based on the first information, that the terminal is allowed to switch the measurement gap type, and the terminal determines, according to a first rule, the measurement gap type corresponding to the first group of MOs, where the first rule includes: if there is a first-type MO in the first group of MOs, the measurement gap type corresponding to the first group of MOs is an MG; or if there is no first-type MO in the first group of MOs, the measurement gap type corresponding to the first group of MOs is an NCSG. Alternatively, the terminal determines, based on the first information, that the terminal is not allowed to switch the measurement gap type, and the terminal determines that the measurement gap type corresponding to the first group of MOs is an MG.

In this possible design, that the first information indicates whether the terminal is allowed to switch the measurement gap type may include one of the following three design forms. In form 1, the first information indicates that the terminal is allowed to switch the measurement gap type. If the terminal receives the first information, the terminal determines, based on the first information, that the terminal is allowed to switch the measurement gap type; otherwise, if the terminal does not receive the first information, the terminal is not allowed to switch the measurement gap type by default. In form 2, the first information indicates that the terminal is not allowed to switch the measurement gap type. If the terminal receives the first information, the terminal determines, based on the first information, that the terminal is not allowed to switch the measurement gap type. If the terminal does not receive the first information, the terminal is allowed to switch the measurement gap type by default. In form 3, the first information indicates whether the terminal is allowed to switch the measurement gap type, that is, content carried in the first information determines whether the terminal is allowed to switch the measurement gap type. For example, the first information may carry a Boolean value "true (true)" or "false (false)". If the first information carries true, it indicates that the terminal is allowed to switch the measurement gap type. If the first information carries false, it indicates that the terminal is not allowed to switch the measurement gap type.

The first rule may be preconfigured by the network device for the terminal, or may be pre-specified in a protocol. This is not limited.

In this embodiment of this application, the first-type MO may include an MO requiring an MG. The MO requiring an MG may indicate that data interruption occurs in a serving cell when measurement is performed on the MO, and a measurement gap type configured for the MO requiring an MG is the MG shown in FIG. 1, to ensure that measurement on the MO is successfully performed.

Step 502: The terminal measures the first group of MOs based on the determined measurement gap type.

Specifically, a process of performing step 502 may include: in step 501, the terminal determines that the measurement gap type corresponding to the first group of MOs is an NCSG, the terminal determines a parameter of the NCSG based on a parameter of an MG pattern configured by the network device for the terminal, and determines a measurement behavior within an ML of the NCSG based on the parameter of the NCSG.

If the terminal determines that the measurement gap type corresponding to the first group of MOs is an MG in step 501, the terminal may directly use the parameter of the MG pattern configured by the network device for the terminal as a parameter of an MG, and determine the measurement behavior within an MGL of the MG based on the parameter of the MG.

The MG pattern may include 26 types of images: GP #0 to GP #25, and parameters of the MG pattern may include an MGRP, an MGL, and the like. Parameters of the NCSG may be shown in FIG. 2, and include a first VIL, an ML, a second VIL, a VIRP, and the like. In this application, the first VIL may be referred to as a VIL 1 or a previous VIL, and the second VIL may be referred to as a VIL 2 or a later VIL. This is uniformly described herein, and details are not described again.

For a specific performing process in which the terminal determines the parameter of the NCSG based on the parameter of the MG pattern configured by the network device for the terminal, refer to the following step 603. For a process in which the terminal performs RRM measurement based on the parameter of the NCSG, refer to the following step 604.

Step 503: The terminal determines a data transmission behavior in a serving cell of the terminal based on the measurement gap type corresponding to the first group of MOs.

In this embodiment of this application, data transmission may include uplink transmission or downlink transmission. Uplink transmission may be sending data from the terminal to the network device, and downlink transmission may be sending data from the network device to the terminal.

For example, that the terminal determines a data transmission behavior in a serving cell of the terminal based on the determined measurement gap type corresponding to the first group of MOs may include:

When the measurement gap type corresponding to the first group of MOs is an NCSG, determining to interrupt data transmission in the serving cell within the first VIL and the second VIL of the NCSG, and in a downlink transmission scenario, performing downlink transmission in the serving cell within the ML of the NCSG or after the NCSG, and in an uplink transmission scenario, determining, within a period of time (for example, in n slots or symbols) after the first VIL, and within a period of time after the second VIL, whether to perform uplink transmission based on internal implementation of the terminal. The method may include: When the measurement gap type corresponding to the first group of MOs is an MG, determining to interrupt data transmission in the serving cell within the MGL of the MG, and continuing data transmission in the serving cell after the MGL of the MG.

Step 504: The network device determines whether the measurement gap type corresponding to the first group of MOs is an MG or an NCSG.

For related descriptions of the first group of MOs, refer to the descriptions in step 501. Details are not described again.

Specifically, an implementation in which the network device determines whether the measurement gap type corresponding to the first group of MOs is an MG or an NCSG is the same as an implementation in which the terminal determines the measurement gap type corresponding to the first group of MOs. Details are not described again. In this way, the network device may determine the measurement gap type corresponding to the first group of MOs, to avoid scheduling data between the VIL and the terminal.

Step 505: The network device performs data scheduling on the terminal based on the measurement gap type corresponding to the first group of MOs.

In this embodiment of this application, data scheduling may include uplink data scheduling or downlink data scheduling. Uplink data scheduling may mean that the network device schedules the terminal to perform uplink data transmission (or uplink transmission for short), and downlink data scheduling may mean that the network device schedules the terminal to perform downlink data transmission (or downlink transmission for short).

For example, that the network device performs data scheduling on the terminal based on the measurement gap type corresponding to the first group of MOs may include any one of the following cases.

When the measurement gap type corresponding to the first group of MOs is an NCSG, and data scheduling is downlink data scheduling, it is determined that data scheduling is not performed on the terminal within the first VIL and the second VIL of the NCSG, and data scheduling is performed on the terminal within the ML of the NCSG and after the NCSG ends.

When the measurement gap type corresponding to the first group of MOs is an NCSG, and data scheduling is uplink data scheduling, the network device determines not to perform data scheduling on the terminal within the first VIL and the second VIL of the NCSG, but performs data scheduling on the terminal after a period of time after the first VIL ends and after a period of time after the second VIL ends. For example, the network device may generate scheduling information, and sends the scheduling information to the terminal. The scheduling information is used for scheduling the terminal to perform uplink transmission after a period of time (for example, n slots or symbols) after the first VIL ends, and perform uplink transmission after a period of time (for example, n slots or symbols) after the second VIL ends.

It should be noted that a length of a period of time after the first VIL may be the same as or different from a length of a period of time after the second VIL. For example, the period of time after the first VIL may be n slots or symbols, or may be designed as n slots or symbols after the first VIL, or m slots or symbols after the second VIL, where n is different from M.

When the measurement gap type corresponding to the first group of MOs is an MG, the network device determines not to perform data scheduling on the terminal within the MGL of the MG, but schedules the terminal to perform data transmission (uplink transmission or downlink transmission) after the MGL of the MG.

It should be noted that a sequence of performing step 504 and step 505 is not limited in this application. Step 504 and step 505 may be performed before step 501, or may be performed together with step 501, or may be performed between step 501 and step 502. This is not limited. In addition, a sequence of performing step 502 and step 503 is not limited in this application. The two steps may be performed at the same time, or may be performed sequentially. This is not limited.

It should be noted that measurement in this embodiment of this application may refer to measurement such as RRM measurement. In addition to performing RRM measurement on the MO within the ML of the NCSG, the terminal may further perform other measurement within the ML of the NCSG, for example, performing L1 measurement of the serving cell of the terminal or another NCSG-based measurement within the ML of the NCSG. This improves resource utilization, and avoids impact of NCSG-based measurement on L1 measurement and other measurement.

Based on the method shown in FIG. 5, for the group of MOs, the measurement gap type used by the group of MOs is determined, and the parameter of the NCSG is determined and RRM measurement is performed based on the determined measurement gap type. There is no need to allocate an NCSG pattern to each MO requiring an NCSG in the group of MOs, but a same MG pattern is associated, and the parameter of the NCSG is determined based on the MG pattern. This reduces complexity of the measurement gap configuration and implements switching between the MG and the NCSG. In addition, the measurement behavior within the ML of the NCSG is standardized, so that two or more MOs can be measured within the ML of the NCSG. This implements fast measurement.

Figure 6:
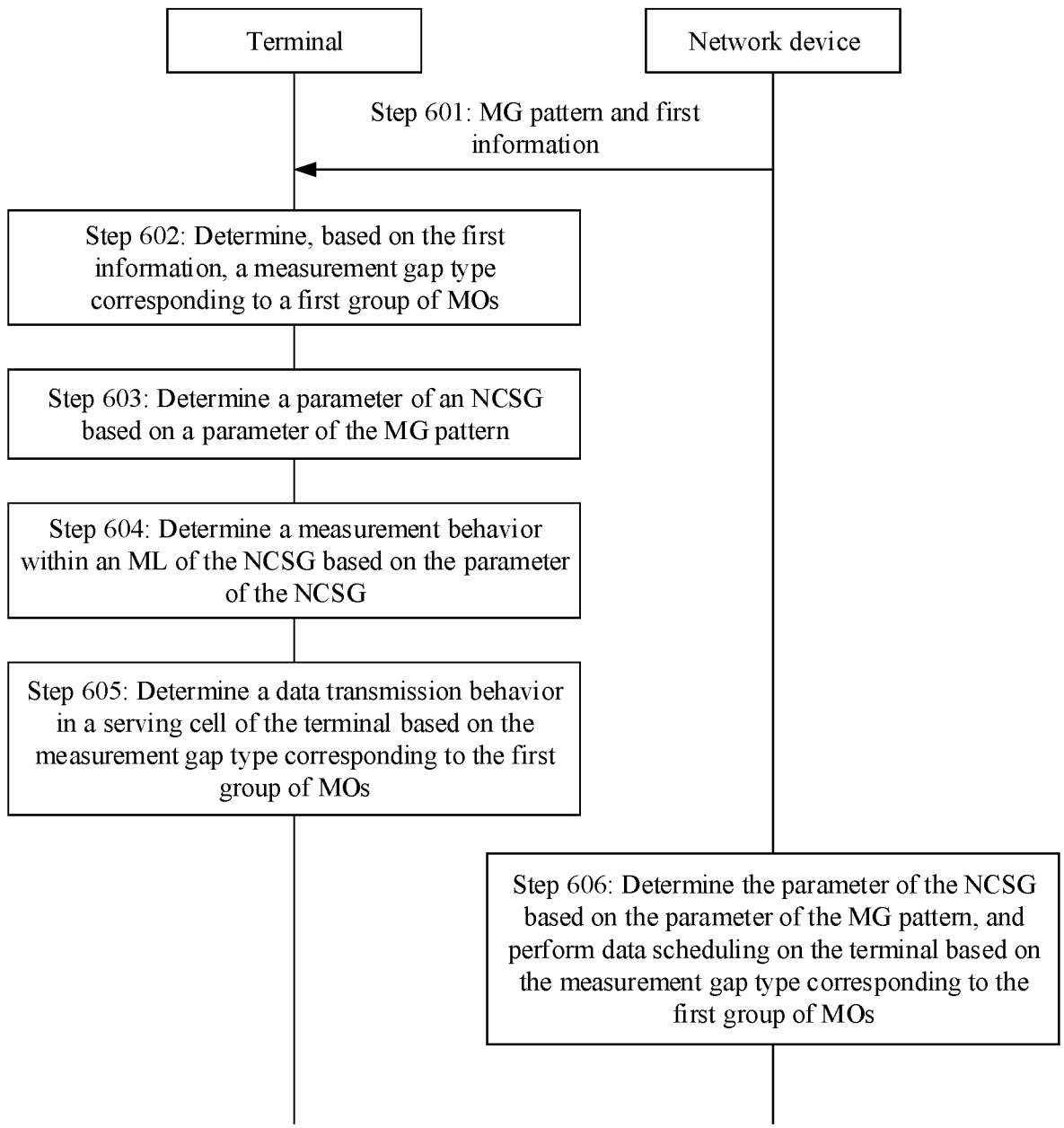
FIG. 6 is a flowchart of another measurement method according to an embodiment of this application.

The following describes the process shown in 5 in detail with reference to the accompanying drawings shown in FIG. 6.

FIG. 6 is another measurement method according to an embodiment of this application. As shown in FIG. 6, the measurement method may include the following steps.

Step 601: A network device configures an MG pattern for a first group of MOs, and sends first information to a terminal.

For related descriptions of the MG pattern, the first group of MOs, and the first information, refer to the descriptions in step 501. For a manner in which the network device configures the MG pattern, refer to the descriptions in step 501. Details are not described again.

It should be understood that, based on different design forms of the first information, the network device may configure the MG pattern for the terminal and send the first information to the terminal at the same time, or may sequentially perform the operations. This is not limited.

Step 602: The terminal determines, based on the first information, a measurement gap type corresponding to the first group of MOs. If the terminal determines, based on the first information, that the measurement gap type corresponding to the first group of MOs is an NCSG, step 603 to step 605 are performed. If the terminal determines, based on the first information, that the measurement gap type corresponding to the first group of MOs is an MG, the terminal measures, within the MG, an MO requiring an MG and an MO requiring an NCSG in the first group of MOs, that is, the MO requiring an NCSG is measured only within the MG, and interrupts data transmission in the serving cell within the MGL of the MG.

For related descriptions of the first group of MOs, refer to the descriptions in step 501. Details are not described again.

For example, for a performing process in which the terminal determines, based on the first information, the measurement gap type corresponding to the first group of MOs, refer to the descriptions in step 501. For example, the measurement gap type is determined based on an indication of the first information, or the measurement gap type is determined according to a first rule and based on an indication of the first information. For a specific performing process, refer to the foregoing description. Details are not described again.

Step 603: The terminal determines a parameter of the NCSG based on a parameter of the MG pattern.

For example, that the terminal determines a parameter of the NCSG based on a parameter of the MG pattern configured by the network device for the terminal may include:

The terminal uses an MGRP corresponding to the MG pattern as a VIRP of the NCSG, that is, a value of duration of the VIRP of the NCSG is the same as a value of duration of the MGRP corresponding to the MG pattern; and the terminal uses, as an ML of the NCSG, a time length obtained by removing a first VIL and a second VIL of the NCSG from the VIRP of the NCSG.

For example, FIG. 1 and FIG. 2 are used as an example. It is assumed that the MG shown in FIG. 1 includes a radio frequency adjustment time (part 1) before measurement, a measurement time (part 2), and a radio frequency adjustment time (part 3) after measurement. The terminal may consider that duration of the part 1 is equal to the first VIL, duration of the part 3 in the MG shown in FIG. 1 is equal to the second VIL, and the terminal may use the MGRP in FIG. 1 as the VIRP in FIG. 2. The part 2 obtained by removing the part 1 and the part 3 from the MGL shown in FIG. 1 is used as the ML of the NCSG.

In a possible design, regardless of an uplink data scheduling scenario or a downlink data scheduling scenario, duration of the first VIL and duration of the second VIL may be set to be equal to duration of a VIL corresponding to the MG pattern configured by the network device for the terminal. In this way, an uplink transmission behavior of the terminal within the period of time after the first VIL and the second VIL may be defined, to prolong interruption duration of uplink data sending within the first VIL and the second VIL. In another possible design, during uplink data scheduling, duration of the first VIL and duration of the second VIL may be set to be greater than duration of a VIL corresponding to the MG pattern configured by the network device for the terminal. In this way, interruption duration of uplink data sending within the first VIL and the second VIL can be prolonged. In still another possible design, during uplink data scheduling, the first VIL may be set to be greater than duration of a VIL corresponding to the MG pattern configured by the network device for the terminal, and duration of the second VIL is set to be equal to the VIL corresponding to the MG pattern. In this way, interruption duration of uplink data sending within the first VIL may be prolonged. The interruption duration of uplink data sending within the second VIL may be prolonged by defining an uplink transmission behavior of the terminal within a period of time after the second VIL or the NCSG.

It should be noted that, in an uplink data scheduling scenario, whether to perform uplink transmission within a period of time after the first VIL and the second VIL may be determined based on internal implementation of the terminal. The terminal expects to prolong the interruption duration of uplink data sending after a radio frequency corresponding to enabling/disabling of the MO. A possible reason is that timing of uplink transmission is ahead of timing of downlink measurement. Therefore, a time when the terminal actually sends uplink data may overlap an interruption time when the radio frequency corresponding to the MO is enabled or adjusted.

The VIL corresponding to the MG pattern may be predefined as required. For the MG pattern per UE, or the MG pattern per FR corresponding to a first FR (for example, the FR1), the VIL corresponding to the MG pattern may be set to 0.5 ms. For the MG pattern per FR corresponding to the second FR (for example, the FR2), the VIL corresponding to the MG pattern may be set to 0.25 ms.

For example, the first FR is the FR1. It is assumed that the VIL corresponding to the MG pattern per UE or the MG pattern per FR corresponding to the FR1 is set to 0.5 ms. For downlink data scheduling, a time that is within the NCSG and that uses a start location of the MGL of the MG pattern as a start time and a length of which is 0.5 ms is the first VIL (or referred to as a VIL 1 or a previous VIL), and a time of last 0.5 ms within the MGL of the MG pattern is the second VIL (or referred to as a VIL 2 or a later VIL). Data interruption occurs in the serving cell within the first 0.5 ms and the last 0.5 ms. In an uplink data scheduling scenario, if duration of the first VIL is greater than duration of the VIL corresponding to the MG pattern, and duration of the second VIL is equal to duration of the VIL corresponding to the MG pattern, a time length that is within the NCSG and that uses a start location of the NCSG as a start time and a time length of which is 0.5 ms and duration occupied by the following x slots (for example, one or two slots) are the first VIL, and a length of last 0.5 ms within the NCSG is the second VIL. Data interruption occurs in the serving cell within the first 0.5 ms+x slots and the last 0.5 ms. In addition, it may be defined that the UE determines whether the terminal performs uplink transmission in the duration of the second VIL or in the x slots after the NCSG. It should be understood that a quantity of x slots may be set based on a requirement. This is not limited.

For another example, the second FR is the FR2. It is assumed that a VIL corresponding to an MG pattern per FR corresponding to the FR2 is set to 0.25 ms. For downlink data scheduling, a time length that is within the NCSG and that uses a start location of the NCSG as a start time and a length of which is 0.25 ms is the first VIL (or referred to as a VIL 1 or a previous VIL), and a time length of last 0.25 ms within the NCSG is the second VIL (or referred to as a VIL 2 or a later VIL). Data interruption occurs in the serving cell within the first 0.25 ms and the last 0.25 ms. For uplink data scheduling, if duration of the first VIL is greater than duration of the VIL corresponding to the MG pattern, and duration of the second VIL is equal to duration of the VIL corresponding to the MG pattern, a time length that is within the NCSG and that uses a start location of the NCSG as a start time and a time length of which is 0.25 ms and duration occupied by the following y slots (for example, one or two slots) are the first VIL, and slots of last 0.25 ms within the NCSG are the second VIL. Data interruption occurs in the serving cell within the first 0.25 ms+y slots and the last 0.25 ms. In addition, it may be defined that whether the terminal performs uplink transmission in the duration of the second VIL or in the y slots after the NCSG is determined by the UE. It should be understood that a quantity of y slots may be set based on a requirement. This is not limited.

Step 604: The terminal determines a measurement behavior within an ML of the NCSG based on the parameter of the NCSG.

For example, the measurement behavior within the ML of the NCSG may include the following two measurement behaviors:

First measurement behavior: If the terminal supports measurement of a third-type MO within the ML of the NCSG, the terminal measures a second-type MO and the third-type MO within the ML of the NCSG. A measurement behavior of measuring the second-type MO and the third-type MO by the terminal is the same as a measurement behavior of the terminal outside the MGL of the MG. In this way, when the terminal supports measurement of the third-type MO within the ML of the NCSG, RRM measurement can be performed on two or more types of MOs, to implement faster measurement.

For the first measurement behavior, when measurement requirements of the second-type MO and the third-type MO are defined, it is considered that measurement resources within the ML of the NCSG are available resources for the third-type MO, but measurement opportunities within the ML of the NCSG are shared between the second-type MO and the third-type MO. Specifically, sharing of the measurement opportunity between the second-type MO and the third-type MO may be implemented by using a carrier specific scaling factor (carrier specific scaling factor, CSSF) outside the MG.

Second measurement behavior: If the terminal does not support measurement of a third-type MO within the ML of the NCSG, the terminal measures only a second-type MO within the ML of the NCSG, and does not measure the third-type MO. A measurement behavior of measuring the second-type MO by the terminal is the same as a measurement behavior of the terminal within the MGL of the MG, and a measurement behavior of the third-type MO is the same as a measurement behavior of the terminal outside the MGL of the MG. In this way, when the terminal does not support measurement of the third-type MO within the ML of the NCSG, an existing measurement behavior within the MGL can be reused. This simplifies a system design and implements compatibility of the measurement behavior.

For the second measurement behavior, when measurement requirements of the second-type MO and the third-type MO are defined, it is considered that measurement resources within the ML of the NCSG are unavailable resources for the third-type MO, and measurement opportunities within the ML of the NCSG are shared between second-type MOs, for example, sharing of the measurement opportunities between the second-type MOs is implemented by using a CSSF factor within the MG. Measurement opportunities outside the ML of the NCSG are shared between third-type MOs, for example, sharing of the measurement opportunity between the third-type MOs is implemented by using a CSSF factor outside the MG.

Whether the terminal supports measurement of the third-type MO within the ML of the NCSG may be predefined/defaulted in a protocol that the terminal supports or does not support measurement of the third-type MO, or whether the terminal supports measurement of the third-type MO within the ML of the NCSG is one type of information in capability information of the terminal. The terminal may report the capability information to the network device, for example, the terminal sends third information to the network device. The third information indicates whether the terminal supports measurement of the third-type MO within the ML of the NCSG. In this way, the network device determines a measurement delay of the terminal based on the third information. For example, the network device may estimate the measurement delay of the terminal based on the third information, and adjust the configuration of the MO or the MG based on a requirement of the network device for the measurement delay.

In this embodiment of this application, the measurement behavior of the terminal within the MGL of the MG may include: The terminal performs RRM measurement on an MO, and data transmission (for example, uplink data transmission or downlink data transmission) in the serving cell of the terminal is interrupted. The measurement behavior of the terminal outside the MGL of the MG may include: Data transmission is performed between the terminal and the network device in the serving cell, and the terminal performs RRM measurement on two or more MOs.

In this application, the second-type MO may include an MO requiring an NCSG. Data interruption occurs in the serving cell only when a radio frequency chain corresponding to the second-type MO is enabled and/or disabled. Data transmission in the serving cell is not affected when the second-type MO is measured within the ML. The second-type MO can be measured only within the MG and the NCSG.

In this application, the third-type MO may include an MO requiring no MG and NCSG, that is, include an MO that does not need an MG or an NCSG, or may be replaced with a description that the third-type MO includes an MO that requires no-gap (no-gap), and measurement of the third-type MO does not cause data interruption of the serving cell. There is no measurement gap when measurement of the MO that requires no-gap is performed, and a process of performing measurement on the MO that requires no-gap does not affect data transmission in the serving cell, and data in the serving cell is not interrupted. Optionally, the MO that requires no-gap is not measured within the MGL, but whether the MO can be measured within the ML of the NCSG is determined based on the determining manner described in step 604.

For example, the terminal is UE. The UE currently has two serving cells, the two serving cells are on frequencies f1 and f2, and have four measurement objects (MO). The four MOs are separately on frequencies f1, f2, f3, and f4. According to UE capability reporting or a predefined rule, the network device may determine which one of {MG, NCSG, no-gap} is required by the UE for measurement of each MO, and notify the UE of a result. It is assumed that in the four MOs, f1, f2, and f3 are MOs that require an NCSG, and f4 is an MO that requires no-gap. If the UE supports measurement of the third-type MO within the ML of the NCSG, the UE may simultaneously measure f1, f2, f3, and f4 within the ML of the NCSG. If the UE does not support measurement of the third-type MO within the ML of the NCSG, the UE measures only f1, f2, and f3 within the ML of the NCSG, and does not measure f4.

Step 605: The terminal determines a data transmission behavior in a serving cell of the terminal based on the measurement gap type corresponding to the first group of MOs.

When data transmission is downlink transmission, for a process of performing step 605, refer to the descriptions in step 503. For example, the terminal determines to interrupt downlink transmission in the serving cell within the first VIL and the second VIL of the NCSG, and performs downlink transmission in the serving cell within the ML of the NCSG or after the NCSG.

When data transmission is uplink data transmission, a process of performing step 605 may include: interrupting downlink transmission in the serving cell within the first VIL and the second VIL of the NCSG, and whether to perform uplink transmission in the serving cell within the ML of the NCSG or after the NCSG depends on internal implementation of the terminal. For example:

When duration of the first VIL and duration of the second VIL are equal to duration of the VIL corresponding to the MG pattern, whether the terminal performs uplink transmission after the first VIL of the NCSG (for example, in n slots or symbols after the first VIL) is determined by the terminal, and whether the terminal performs uplink transmission after the second VIL of the NCSG (for example, in n slots or symbols after the second VIL) is determined by the terminal. This behavior of the terminal is similar to an uplink sending behavior of the terminal in several slots or symbols after the MG (that is, determining whether to perform uplink transmission). That is, in an uplink data scheduling scenario, whether the terminal performs uplink transmission after the first VIL, after the second VIL, or within a period of time after the MG depends on internal implementation of the terminal. For example, even if the network device schedules the terminal device to perform uplink transmission within the period of time, the terminal sends uplink data if the terminal determines to send the uplink data, or the terminal does not send uplink data if the terminal determines not to send the uplink data.

When duration of the first VIL is greater than duration of the VIL corresponding to the MG pattern, and duration of the second VIL is equal to duration of the VIL corresponding to the MG pattern, whether the terminal performs uplink transmission after the second VIL of the NCSG (for example, in several slots or symbols after the second VIL) is determined by the terminal. This behavior of the terminal is similar to an uplink sending behavior (that is, determining whether to perform uplink transmission) of the terminal in several slots or symbols after the MG. That is, in an uplink data scheduling scenario, whether the terminal performs uplink transmission after the second VIL depends on internal implementation of the terminal.

In this way, an uplink transmission behavior of the terminal in the uplink data scheduling scenario can be reused, a system design is simplified, compatibility is implemented, and autonomy of performing uplink transmission by the terminal is improved.

In this embodiment of this application, after the second VIL may be replaced with after the NCSG. In addition, a value of n described in this application is not limited, where n may be an integer greater than or equal to 0, and n may be predefined in a protocol or may be determined based on a communication parameter of the terminal. A quantity and/or time lengths of n time units after the first VIL and n time units after the second VIL may be the same or different. This is not limited. The time unit in this application may include but is not limited to a slot, a symbol, and the like.

Step 606: The network device determines whether the measurement gap type corresponding to the first group of MOs is an MG or an NCSG, and if the measurement gap type corresponding to the first group of MOs is an NCSG, determines a parameter of the NCSG based on a parameter of the MG pattern, and performs data scheduling on the terminal based on the measurement gap type corresponding to the first group of MOs.

Further, optionally, if the measurement gap type corresponding to the first group of MOs is an MG, the parameter of the MG pattern is used as a parameter of the MG, and at the same time, the terminal is not scheduled within the MGL of the MG, but data scheduling is performed on the terminal after the MGL of the MG.

For related descriptions of the first group of MOs, refer to the foregoing description. For a process in which the network device determines whether the measurement gap type corresponding to the first group of MOs is an MG or an NCSG, refer to the descriptions in step 504. For a process in which the network device determines the parameter of the NCSG based on the parameter of the MG pattern, refer to the foregoing process in which the terminal determines the parameter of the NCSG based on the parameter of the MG pattern. Details are not described again.

For a performing process in which the network device performs data scheduling on the terminal based on the measurement gap type corresponding to the first group of MOs, refer to the descriptions in step 505. For example, for the network device side, an uplink transmission behavior within a period of time after the first VIL and the second VIL depends on internal implementation of the terminal. In this case, to reduce power consumption of the network device, scheduling may not be performed within the period of time after the first VIL and the second VIL, but after the period of time after the first VIL and the second VIL ends, the network device may schedule normal uplink data transmission. For example, when data scheduling is uplink data scheduling, the network device generates scheduling information, and sends the scheduling information to the terminal. The scheduling information may be used for scheduling the terminal to perform uplink transmission after n slots slots or symbols symbols after the first VIL end, and for scheduling the terminal to perform uplink transmission after n slots or symbols after the second VIL end.

In this way, the network device may schedule the terminal to perform uplink transmission after the n slots or symbols after the first VIL end, and uplink transmission of the terminal is not affected. In addition, this avoids a problem that the network device schedules the terminal to perform uplink transmission in the n slots slots or symbols symbols after the first VIL, but the terminal does not perform uplink transmission in this period of time based on internal implementation. As a result, uplink transmission scheduling fails and power consumption of the network device and a resource waste are caused.

It should be noted that a sequence of performing step 606 is not limited in this application. Step 606 may be performed before step 601, or may be performed together with step 601, step 602, or step 603, or may be performed between step 602 and step 603. This is not limited.

It should be noted that measurement in this embodiment of this application may include but is not limited to RRM measurement. In addition to performing RRM measurement on the MO within the ML of the NCSG, the terminal may further perform other measurement within the ML of the NCSG, for example, performing L1 measurement of the serving cell of the terminal or other measurement within the ML of the NCSG. This improves resource utilization, and avoids impact on L1 measurement and other measurement.

Based on the method shown in FIG. 6, one MG pattern is reused between the MG and the NCSG. This simplifies a signaling design of the NCSG configuration, enables the terminal to reuse an existing measurement behavior of the MG, and implements fast switching between the MG and the NCSG. In addition, the terminal is allowed to measure or not measure another MO requiring no MG within the ML time of the NCSG based on whether the terminal supports measurement of the MO requiring no MG within the ML of the NCSG. Different terminals are distinguished for implementation, so that the terminal that can simultaneously support measurement of the two types of MOs can implement faster measurement, and the terminal that cannot simultaneously support measurement of the two types of MOs can reuse the existing implementation. This simplifies the system design and implements compatibility.

In addition to the measurement behavior within or outside the NCSG designed in the foregoing method embodiment, for a to-be-measured MO (for example, the first group of MOs), this embodiment of this application further provides the following measurement behavior:

In a possible design, an MO included in the first group of MOs corresponds to a first measurement behavior. That is, all MOs included in the first group of MOs correspond to a same measurement behavior. The MO included in the first group of MOs may be measured within the NCSG, or may be measured outside the NCSG. In this case, it means that the terminal does not consider the NCSG as a special measurement opportunity for measuring a part of MOs during measurement, and does not consider the NCSG as an unavailable measurement opportunity.

In this possible design, the first group of MOs may include the third-type MO. As described above, the third-type MO may include an MO requiring no MG and NCSG. For example, when the first group of MOs may include only the third-type MO, all MOs included in the third-type MO may be measured by using the first measurement behavior.

In this possible design, the first group of MOs may include the second-type MO and the third-type MO. As described above, the second-type MO may include an MO requiring an NCSG, and the third-type MO may include an MO requiring no MG and NCSG. In this case, if the terminal supports measurement of the second-type MO and the third-type MO within the NCSG, both the second-type MO and the third-type MO included in the first group of MOs may be applied to the first measurement behavior, and measurement is performed within or outside the NCSG by using the first measurement behavior.

When the first group of MOs includes the third-type MO, if the third-type MO includes a deactivated MO, the terminal determines that measurement interruption provided for the deactivated MO is within the VIL of the NCSG, that is, a radio frequency corresponding to the MO may be enabled or disabled within the VIL of the NCSG. In this case, the terminal may not be allowed to generate additional measurement interruption for the deactivated MO, the terminal device may be allowed to enable/disable the radio frequency, to save power consumption of the terminal, and control, by using the VIL, a location at which the terminal device generates interruption due to enabling/disabling of the radio frequency. This increases resource utilization.

In this embodiment of this application, the first measurement behavior may include one or more of the following: (1) A scaling factor CSSF corresponding to each MO is obtained according to a first calculation manner, and the first calculation manner is a calculation manner used for measurement outside the MG. In this way, all MOs included in the first group of MOs may share a same measurement resource. In addition, in the first calculation manner, the terminal device may simultaneously measure two MOs. This can reduce a measurement delay. (2) A scaling factor Kp for L3 measurement is equal to 1. That is, the NCSG does not reduce measurement opportunities for L3 measurement, to ensure normal L3 measurement. (3) A scaling factor Klayer1 for L1 measurement is determined based on measurement periods of all L1 measurement reference signals within and outside the NCSG. (4) A calculation manner used for calculating the scaling factor CSSF when the NCSG and a synchronization signal and physical broadcast channel block (SSB) measurement timing configuration (SMTC) overlap is the same as a calculation manner used for calculating the scaling factor CSSF when the NCSG and the SMTC do not overlap.

In this embodiment of this application, when determining a scaling factor Klayer1 corresponding to an MO, the terminal device determines whether L1 measurement and measurement of the MO overlap in terms of time, that is, a reference signal measured by the MO and an L1 measurement reference signal within and outside the NCSG in one or more serving cells overlap in terms of time. If L1 measurement exists, the terminal device determines whether a measurement opportunity needs to be shared for measurement of the MO and L1 measurement, that is, whether measurement of the MO and L1 measurement can use different receive beams. For example, if measurement of the MO and L1 measurement are in the same frequency band, it is determined that measurement activation needs to be shared for measurement of the MO and L1 measurement, and Scaling factor Klayer1>1; and if measurement of the MO and L1 measurement are in different frequency bands and the UE supports use of independent receive beams on the two frequency bands, it is determined that measurement activation needs to be shared for measurement of the MO and L1 measurement, and Scaling factor Klayer1=1.

In this embodiment of this application, that the NCSG and the SMTC overlap may mean that the SMTC falls within the NCSG or the SMTC belongs to the NCSG. For example, a time start point of the SMTC is later than a time start point of the NCSG, and a time end point of the SMTC is earlier than a time end point of the NCSG. That the NCSG and the SMTC do not overlap may mean that the SMTC is completely outside the NCSG, or a part of the SMTC is outside the NCSG, or the like. This is not limited.

In another possible design, a part of MOs in the first group of MOs may be measured within the NCSG, and a part of MOs may be measured outside the NCSG. A measurement behavior corresponding to an MO measured within the NCSG is different from a measurement behavior corresponding to an MO measured outside the NCSG. For example, a first part of MOs in the first MO corresponds to a second measurement behavior, a second part of MOs corresponds to a third measurement behavior, and the second measurement behavior is different from the third measurement behavior.

In this possible design, during measurement, the terminal device considers the NCSG as a special measurement opportunity for measuring a part of MOs.

In this possible design, the first group of MOs may include the second-type MO and the third-type MO. When the terminal does not support measurement of the second-type MO and the third-type MO within the NCSG, the first part of MOs may include the second-type MO, that is, the second-type MO is measured within the NCSG, and corresponds to the second measurement behavior. The second part of MOs may include the third-type MO, that is, the third-type MO may be measured outside the NCSG, and corresponds to the third measurement behavior.

It should be noted that, if the third-type MO includes a deactivated MO, because measurement interruption cannot be provided for the deactivated MO within the VIL of the NCSG, the terminal may determine to provide additional measurement interruption for the deactivated MO, that is, the terminal is allowed to generate additional measurement interruption for the deactivated MO, to ensure enabling/disabling of a radio frequency channel corresponding to the deactivated MO, and normal measurement of the deactivated MO.

In this possible design, the first group of MOs may include only the third-type MO. If the third-type MO includes a deactivated MO, the first part of MOs may include the deactivated MO in the third-type MO, that is, the deactivated MO may be measured within the NCSG, and correspond to the second measurement behavior, the terminal may provide measurement interruption for the deactivated MO within the VIL of the NCSG, and the deactivated MO does not generate additional measurement interruption. In this case, the terminal is not allowed to generate additional measurement interruption for the deactivated MO. The second part of the MOs may include an MO other than the deactivated MO in the third-type MO, that is, the MO other than the deactivated MO in the third-type MO may be measured outside the NCSG, and correspond to the third measurement behavior.

In this possible design, the first group of MOs may include the second-type MO and the third-type MO. When the terminal supports measurement of the second-type MO and the third-type MO within the NCSG, the first part of MOs may include the second-type MO, that is, the second-type MO is measured within the NCSG, and corresponds to the second measurement behavior. Whether the third-type MO may be included in the first part of MOs and measured within the NCSG or whether the deactivated MO included in the third-type MO may be included in the first part of MOs and measured within the NCSG may be determined based on a network configuration or according to a preset rule. The following describes the third-type MO and the measurement behavior of the deactivated MO included in the third-type MO.

In an implementation, the terminal measures only the second-type MO within the NCSG, and measures the third-type MO outside the NCSG. If the third-type MO includes a deactivated secondary component carrier (SCC), because measurement interruption cannot be provided for the deactivated MO within the VIL of the NCSG, the terminal is allowed to generate additional measurement interruption for the deactivated SCC, that is, the terminal may determine to provide additional measurement interruption for the deactivated MO, to ensure enabling/disabling of a radio frequency channel corresponding to the deactivated MO, and normal measurement of the deactivated MO.

In still another implementation, the terminal measures the second-type MO and the deactivated SCC within the NCSG, and measures an MO other than the deactivated MO in the third-type MO outside the NCSG. This corresponds to the third measurement behavior. The terminal may provide measurement interruption for the deactivated MO within the VIL of the NCSG, and the terminal is not allowed to generate additional measurement interruption for the deactivated SCC.

In this embodiment of this application, the second measurement behavior includes one or more of the following: (1) A scaling factor CSSF corresponding to each MO within the NCSG is obtained according to a second calculation manner, and the second calculation manner is a calculation manner used for measurement within the MG. (2) A scaling factor Klayer1 for L1 measurement is determined based on a measurement period of a L1 measurement reference signal within the NCSG.

In this embodiment of this application, when determining a scaling factor Klayer1 corresponding to an MO, the terminal device determines whether L1 measurement and measurement of the MO overlap in terms of time, that is, a reference signal measured by the MO and an L1 measurement reference signal within the NCSG in one or more serving cells overlap in terms of time. If L1 measurement exists, the terminal device determines whether a measurement opportunity needs to be shared for measurement of the MO and L1 measurement, that is, whether measurement of the MO and L1 measurement can use different receive beams. For example, if measurement of the MO and L1 measurement are in the same frequency band, it is determined that measurement activation needs to be shared for measurement of the MO and L1 measurement, and Scaling factor Klayer1>1; and if measurement of the MO and L1 measurement are in different frequency bands and the UE supports use of independent receive beams on the two frequency bands, it is determined that measurement activation needs to be shared for measurement of the MO and L1 measurement, and Scaling factor Klayer1=1.

In this embodiment of this application, the third measurement behavior includes one or more of the following: (1) When the NCSG and an SMTC do not overlap, a scaling factor CSSF corresponding to each MO outside the NCSG is determined according to a calculation manner used for measurement outside the MG. (2) When the NCSG and the SMTC do not overlap, a scaling factor Kp for L3 measurement is greater than 1. (3) When the NCSG and the SMTC do not overlap, a scaling factor Klayer1 for L1 measurement is determined based on a measurement period of a L1 measurement reference signal outside the NCSG. (4) A calculation manner used for calculating the scaling factor CSSF when the NCSG and the SMTC overlap is a calculation manner within the MG, and the scaling factor Klayer1 for L1 measurement is determined based on a measurement period of a L1 measurement reference signal within the NCSG.

In this embodiment of this application, when determining a scaling factor Klayer1 corresponding to an MO, the terminal device determines whether L1 measurement and measurement of the MO overlap in terms of time, that is, a reference signal measured by the MO and an L1 measurement reference signal within and outside the NCSG in one or more serving cells overlap in terms of time. If L1 measurement exists, the terminal device determines whether a measurement opportunity needs to be shared for measurement of the MO and L1 measurement, that is, whether measurement of the MO and L1 measurement can use different receive beams. For example, if measurement of the MO and L1 measurement are in the same frequency band, it is determined that measurement activation needs to be shared for measurement of the MO and L1 measurement, and Scaling factor Klayer1>1; and if measurement of the MO and L1 measurement are in different frequency bands and the UE supports use of independent receive beams on the two frequency bands, it is determined that measurement activation needs to be shared for measurement of the MO and L1 measurement, and Scaling factor Klayer1=1.

In the foregoing solution, a unified measurement behavior may be used for all to-be-measured MOs, or the to-be-measured MOs are classified into two types: measurement within the NCSG and measurement outside the NCSG, to ensure measurement flexibility. In addition, an interruption requirement for the terminal to measure the deactivated MO is specified, and a feasible solution is provided for the terminal to determine whether to provide measurement interruption for the deactivated MO.

In a possible implementation, the first group of MOs in the foregoing embodiment includes a deactivated SCC. If the terminal determines that the measurement gap type corresponding to the first group of MOs is an NCSG, the terminal may measure the deactivated SCC by using the following method. The terminal may determine, based on the first information in the foregoing embodiment, the measurement gap type corresponding to the first group of MOs.

In a possible design, step 502 includes: The terminal determines, based on a parameter of the NCSG and attribute information of the deactivated SCC, a measurement behavior of the deactivated SCC, or the terminal determines, based on attribute information of the deactivated SCC, a measurement behavior of the deactivated SCC. For details, refer to descriptions in the following case (1) and case (2).

Case (1): The terminal determines, based on a parameter of the NCSG and attribute information of the deactivated SCC, a measurement behavior of the deactivated SCC.

Parameters of the NCSG include an ML and a VIRP. The attribute information of the deactivated SCC includes an SMTC of the deactivated SCC.

In a possible implementation, if the NCSG and the SMTC of the deactivated SCC completely or partially overlap, the terminal measures the deactivated SCC within the NCSG; or if the NCSG and the SMTC of the deactivated SCC do not overlap, the terminal measures the deactivated SCC outside the NCSG.

In this embodiment of this application, that the NCSG and the SMTC of the deactivated SCC completely overlap may mean that all the SMTCs of the deactivated SCC fall within the ML of the NCSG. Specifically, in time domain, the SMTC of the deactivated SCC may correspond to at least one first time period, the ML may include at least one second time period, and any one of the at least one first time period is included in one second time period. Two first time periods and two second time periods are used as examples for description. If the $1^{st}$ first time period is from 10 ms to 13 ms, the $2^{nd}$ first time period is from 30 ms to 33 ms, the $1^{st}$ second time period is from 10 ms to 15 ms, and the $2^{nd}$ second time period is from 30 ms to 35 ms, the NCSG and the SMTC of the deactivated SCC completely overlap. Alternatively, if the $1^{st}$ first time period is from 10 ms to 15 ms, the $2^{nd}$ first time period is from 30 ms to 35 ms, the v second time period is from 10 ms to 15 ms, and the $2^{nd}$ second time period is from 30 ms to 35 ms, the NCSG and the SMTC of the deactivated SCC completely overlap.

In this embodiment of this application, that the NCSG and the SMTC of the deactivated SCC partially overlap may mean that a part of SMTCs of the deactivated SCC fall within the ML of the NCSG. Specifically, in time domain, the SMTC of the deactivated SCC may correspond to a plurality of first time periods, the ML may include at least one second time period, and a part of the plurality of first time periods are included in one second time period. It may be understood that, when the NCSG and the SMTC of the deactivated SCC partially overlap, the terminal measures the deactivated SCC within the NCSG that overlaps the SMTC of the deactivated SCC. Two first time periods and two second time periods are used as an example for description. If the $1^{st}$ first time period is from 10 ms to 13 ms, the $2^{nd}$ first time period is from 30 ms to 33 ms, the $1^{st}$ second time period is from 10 ms to 15 ms, and the $2^{nd}$ second time period is from 50 ms to 55 ms, the NCSG and the SMTC of the deactivated SCC partially overlap, and the terminal may measure the deactivated SCC within the $1^{st}$ first time period, and does not measure the deactivated SCC within the $2^{nd}$ first time period.

In this embodiment of this application, that the NCSG and the SMTC of the deactivated SCC does not overlap may mean that all the SMTCs of the deactivated SCC do not fall within the ML of the NCSG. Specifically, in time domain, the SMTC of the deactivated SCC may correspond to at least one first time period, the ML may include at least one second time period, and any one of the at least one first time period is not included in one second time period. Two first time periods and two second time periods are used as examples for description. If the $1^{st}$ first time period is from 8 ms to 13 ms, the $2^{nd}$ first time period is from 28 ms to 33 ms, the $1^{st}$ second time period is from 10 ms to 15 ms, and the $2^{nd}$ second time period is from 30 ms to 35 ms, the NCSG and the SMTC of the deactivated SCC do not overlap. Alternatively, if the $1^{st}$ first time period is from 5 ms to 8 ms, the $2^{nd}$ first time period is from 25 ms to 28 ms, the $1^{st}$ second time period is from 10 ms to 15 ms, and the $2^{nd}$ second time period is from 30 ms to 35 ms, the NCSG and the SMTC of the deactivated SCC do not overlap.

In this embodiment of this application, measurement within the NCSG may be understood as measurement within an ML of the NCSG. Measurement outside NCSG may be understood as measurement within a time period other than the ML and the VIL. That is, for any VIRP, measurement within the NCSG may be measurement within the ML of the VIRP, and measurement outside the NCSG may be measurement at a time other than the ML and the VIL of the VIRP. The VIRP shown in FIG. 2 is used as an example. Measurement within the NCSG is performed within an ML of the VIRP, and measurement outside the NCSG is performed at a time other than the ML, the first VIL, and the second VIL of the VIRP.

It can be understood that, in case (1), the network device may control a measurement behavior of the terminal by controlling an overlapping relationship between the NCSG and the SMTC of the deactivated SCC (for example, performing measurement within the NCSG or performing measurement outside the NCSG). In this way, when the network device configures the NCSG, the NCSG does not need to completely cover the SMTC of the deactivated SCC, and the configuration is flexible and simple.

Case (2): The terminal determines, based on attribute information of the deactivated SCC, a measurement behavior of the deactivated SCC.

The attribute information of the deactivated SCC includes a measurement period. The measurement period is a measurement period of an SCell corresponding to the deactivated SCC, and may be represented as MeasCycleSCell. The measurement period may be configured by the network device by using RRC signaling.

In a possible implementation, if the measurement period is greater than or equal to a first value, the terminal measures the deactivated SCC within the NCSG; or if the measurement period is less than a first value, the terminal measures the deactivated SCC outside the NCSG.

The first value may be configured by the network device or defined in a protocol. In an example, the first value is 640 ms.

In a possible design, when the measurement period is greater than or equal to a first value, interruption is allowed to occur during measurement of the deactivated SCC. In this embodiment of this application, that interruption occurs during measurement of the deactivated SCC may be understood as that when the measurement period is greater than or equal to a first value, measurement of the deactivated SCC may affect measurement of another serving cell or data transmission of the another serving cell, or measurement of the another serving cell or data transmission of the another serving cell is interrupted, or measurement or data transmission of the another serving cell may not be performed. In this case, the NCSG may be configured to completely or partially overlap the SMTC of the deactivated SCC. In this case, the terminal may include, within the VIL, interruption caused by measurement of the deactivated SCC. For example, within the VIL, the terminal enables a radio frequency chain corresponding to the deactivated SCC, or disables a radio frequency chain corresponding to the deactivated SCC. This can avoid introducing additional interruption.

In a possible design, when the measurement period is less than a first value, interruption is not allowed to occur during measurement of the deactivated SCC. In this embodiment of this application, that no interruption occurs during measurement of the deactivated SCC may be understood as that measurement of the deactivated SCC does not affect measurement of another serving cell or data transmission of the another serving cell, or measurement of the another serving cell or data transmission of the another serving cell is not interrupted, or measurement or data transmission of the another serving cell can be performed. In this case, the terminal may measure the deactivated SCC outside the NCSG. When configuring the NCSG, the network device does not need to enable the NCSG to completely cover the SMTC of the deactivated SCC, so that measurement is performed within the NCSG. The configuration is flexible and simple.

For the foregoing case (1) or case (2), if the terminal measures the deactivated SCC within the NCSG, the deactivated SCC is calculated in a CSSF measured within the NCSG; or if the terminal measures the deactivated SCC outside the NCSG, the deactivated SCC is calculated in a CSSF measured outside the NCSG. The CSSF measured within the NCSG may indicate a quantity of frequencies measured within the NCSG. The CSSF measured outside the NCSG may indicate a quantity of frequencies measured outside the NCSG.

That the deactivated SCC is calculated in the CSSF measured within the NCSG may be understood as that the deactivated SCC is included in the CSSF measured within the NCSG, or the deactivated SCC is included in the calculation when the CSSF measured within the NCSG is calculated, or the deactivated SCC is considered when the CSSF measured within the NCSG is calculated. Similarly, that the deactivated SCC is calculated in the CSSF measured outside the NCSG may be understood as that the deactivated SCC is included in the CSSF measured outside the NCSG, or the deactivated SCC is included in the CSSF measured outside the NCSG, or the deactivated SCC is included in the calculation when the CSSF measured outside the NCSG is calculated, or the deactivated SCC is considered when the CSSF measured outside the NCSG is calculated.

In a possible implementation, for the foregoing case (1) or case (2), if the terminal measures the deactivated SCC within the NCSG, no interruption occurs during measurement of the deactivated SCC. It may be understood that, when the terminal measures the deactivated SCC within the NCSG, the terminal may include, within the VIL, interruption caused by measurement of the deactivated SCC. For example, within the VIL, the terminal enables a radio frequency chain corresponding to the deactivated SCC, or disables a radio frequency chain corresponding to the deactivated SCC. Therefore, no interruption occurs during measurement of the deactivated SCC.

In another possible implementation, for the foregoing case (1) or case (2), if the terminal measures the deactivated SCC within the NCSG, no interruption occurs in an activated cell in a frequency band different from a frequency band in which the deactivated SCC is located during measurement of the deactivated SCC, but interruption occurs in an activated cell in a frequency band that is the same as the frequency band in which the deactivated SCC is located.

The activated cell (referred to as an activated cell in a different frequency band below) in the frequency band different from the frequency band in which the deactivated SCC is located may be understood as that a frequency band in which the activated cell is located is different from a frequency band in which the deactivated SCC is located. In this case, the terminal may include, within the VIL, interruption caused by measurement of the deactivated SCC. For example, within the VIL, the terminal enables a radio frequency chain corresponding to the deactivated SCC, or disables a radio frequency chain corresponding to the deactivated SCC. Therefore, no interruption occurs during measurement of the deactivated SCC. The activated cell (referred to as an activated cell in a same frequency band below) in the frequency band that is the same as the frequency band in which the deactivated SCC is located may be understood as that a frequency band in which the activated cell is located is the same as a frequency band in which the deactivated SCC is located. In this case, in addition to enabling or disabling of the radio frequency chain affecting the activated cell in the same frequency band, the activated cell in the same frequency band may be affected by other reasons. For example, after the terminal enables the radio frequency chain, the activated cell in the same frequency band is also affected within a time period in which the terminal adjusts power. If the time period of power adjustment is not included within the VIL, interruption occurs in the activated cell in the same frequency band.

For the foregoing case (1), because interruption occurs when the terminal enables a radio frequency chain corresponding to the deactivated SCC, or disables a radio frequency chain corresponding to the deactivated SCC, interruption may occur during measurement of the deactivated SCC when the terminal measures the deactivated SCC outside the NCSG. For the foregoing case (2), when the measurement period is less than a first value, interruption is not allowed to occur during measurement of the deactivated SCC. For example, the terminal may always enable a radio frequency chain corresponding to the deactivated SCC. Therefore, no interruption occurs during measurement of the deactivated SCC when the terminal measures and deactivates the SCC outside the NCSG.

In a possible implementation, after determining a measurement behavior of any MO in the first group of MOs, the terminal may further determine an L1 measurement behavior of a first serving cell. For example, the terminal may determine the L1 measurement behavior of the first serving cell after step 502, or after step 604, or after the terminal determines the measurement behavior of the deactivated SCC. The first serving cell is a serving cell of the terminal. For example, the first serving cell is a serving cell whose frequency is in a frequency range 2 (frequency range 2, FR2). L1 measurement of the first serving cell includes a radio link monitoring (Radio Link Monitoring, RLM) measurement, a beam failure detection (Beam Failure Detection, BFD) measurement, an L1-RSRP measurement, or the like of the terminal for the first serving cell.

In a possible implementation, if the terminal has an independent beam management capability between a frequency band in which the first serving cell is located and a frequency band in which all measurement object frequencies within the NCSG are located, the terminal performs L1 measurement of the first serving cell within the NCSG; or if the terminal does not have an independent beam management capability between a frequency band in which the first serving cell is located and a frequency band in which any measurement object frequency within the NCSG is located, the terminal performs L1 measurement of the first serving cell outside the NCSG.

If the terminal does not have an independent beam management capability between a frequency band in which the first serving cell is located and a frequency band in which any measurement object frequency within the NCSG is located, that the terminal performs L1 measurement of the first serving cell outside the NCSG may be understood as: When the terminal has the independent beam management capability between the frequency band in which the first serving cell is located and the frequency band in which all measurement object frequencies within the NCSG are located, the terminal does not perform L1 measurement of the first serving cell outside the NCSG. That is, if the terminal does not have the independent beam management capability between a frequency band in which the first serving cell is located and a frequency band in which N measurement object frequencies within the NCSG are located, the terminal performs L1 measurement of the first serving cell outside the NCSG. N is a positive integer, and N is less than or equal to a quantity of all measurement object frequencies within the NCSG.

For example, the terminal determines that a frequency 1 to a frequency 3 are measured within the NCSG, and the frequency 1 and the frequency 2 belong to a frequency band 1, and the frequency 3 belongs to a frequency band 2. If the terminal supports the independent beam management capability between the frequency band in which the first serving cell is located and the frequency band 1, but does not support the independent beam management capability between the frequency band in which the first serving cell is located and the frequency band 2, the terminal performs L1 measurement of the first serving cell outside the NCSG. If the terminal does not support the independent beam management capability between the frequency band in which the first serving cell is located and the frequency band 1, and does not support the independent beam management capability between the frequency band in which the first serving cell is located and the frequency band 2, the terminal performs L1 measurement of the first serving cell outside the NCSG. If the terminal supports the independent beam management capability between the frequency band in which the first serving cell is located and the frequency band 1, and supports the independent beam management capability between the frequency band in which the first serving cell is located and the frequency band 2, the terminal performs L1 measurement of the first serving cell within the NCSG.

In this embodiment of this application, that the terminal has an independent beam management capability between two frequency bands means that the terminal may receive information by using an independent receive beam on the two frequency bands. That the terminal performs L1 measurement of the first serving cell within the NCSG may be understood as that the terminal performs L1 measurement on the first serving cell within the NCSG, and that the terminal performs L1 measurement of the first serving cell outside the NCSG may be understood as that the terminal performs L1 measurement on the first serving cell outside the NCSG.

It may be understood that, if the terminal has the independent beam management capability between the frequency band in which the first serving cell is located and the frequency band in which all the measurement object frequencies within the NCSG are located, measurement (that is, L3 measurement of the measurement object frequency) performed by the terminal on the measurement object frequency does not affect L1 measurement of the first serving cell, or L1 measurement of the first serving cell is not affected by L3 measurement of the measurement object frequency. Therefore, the terminal may perform L1 measurement of the first serving cell within the NCSG. If the terminal does not have the independent beam management capability between the frequency band in which the first serving cell is located and the frequency band in which any measurement object frequency within the NCSG is located, L3 measurement performed by the terminal on one or more measurement object frequencies affects L1 measurement of the first serving cell, or L1 measurement of the first serving cell is affected by L3 measurement of the one or more measurement object frequencies. Therefore, the terminal cannot perform L1 measurement of the first serving cell within the NCSG, and the terminal may perform L1 measurement of the first serving cell outside the NCSG. In the foregoing process, when L1 measurement of the first serving cell is not affected by L3 measurement of the measurement object frequency, L1 measurement of the first serving cell may be performed within the NCSG. Compared with an MG measurement manner, impact of L3 measurement of the object frequency on L1 measurement of the first serving cell is reduced, an opportunity of L1 measurement is increased, and an L1 measurement delay is reduced.

The foregoing mainly describes the solutions provided in embodiments of this application from a perspective of interaction between nodes. It can be understood that, to implement the foregoing functions, the nodes such as the network device and the terminal include corresponding hardware structures and/or software modules for executing the functions. A person skilled in the art should be easily aware that algorithm steps in examples described with reference to embodiments disclosed in this specification can be implemented in a form of hardware, software, or a combination of hardware and computer software in the methods in embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, functional modules of the network device or the terminal may be obtained through division based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 7:
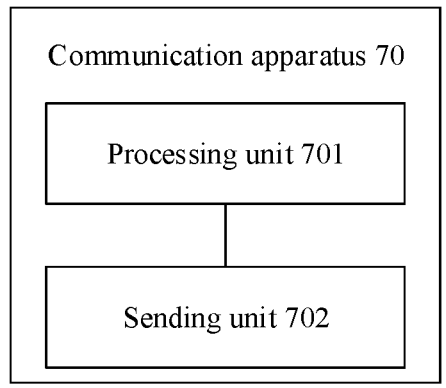
FIG. 7 is a schematic diagram of a composition of a communication apparatus 70 according to an embodiment of this application.

FIG. 7 is a diagram of a structure of a communication apparatus 70. The communication apparatus 70 may be a terminal, a chip in a terminal, a system-on-a-chip, another apparatus that can implement a function of the terminal in the foregoing method, or the like. The communication apparatus 70 may be configured to perform functions of the terminal in the foregoing method embodiments. In a possible implementation, the communication apparatus 70 shown in FIG. 7 includes a processing unit 701 and a sending unit 702.

The processing unit 701 is configured to determine a measurement gap type corresponding to a first group of MOs. The measurement gap type includes a measurement gap MG or an NCSG. For example, the processing unit 701 may support the communication apparatus 70 in performing step 501 and step 602.

The processing unit 701 is further configured to: control, based on the measurement gap type corresponding to the first group of MOs, the sending unit 702 to measure the first group of MOs; and determine a data transmission behavior in a serving cell of the terminal based on the measurement gap type corresponding to the first group of MOs. For example, the processing unit 701 may further support the communication apparatus 70 in performing step 502, step 503, and step 603 to step 605.

Specifically, the processing unit 701 may be configured to: determine that the measurement gap type corresponding to the first group of MOs is an NCSG, and determine a parameter of the NCSG based on a parameter of an MG pattern; and determine a measurement behavior within a measurement length ML of the NCSG based on the parameter of the NCSG.

For related descriptions of the first group of MOs, the MG pattern, and a manner of determining the parameter of the NCSG, refer to the descriptions in the methods in FIG. 5 and FIG. 6. Details are not described again.

Further, the processing unit 701 may be further configured to: determine whether to perform uplink transmission in n slots slots or symbols symbols after a first VIL, and determine whether to perform uplink transmission in n slots or symbols after a second VIL.

Further, the sending unit 702 is further configured to send third information to a network device. The third information indicates whether the terminal supports measurement of a third-type MO within the ML of the NCSG.

Specifically, all related content of the steps in the foregoing method embodiments shown in FIG. 5 and FIG. 6 may be cited in function descriptions of the corresponding functional modules. Details are not described herein again. The communication apparatus 70 is configured to perform functions of the terminal in the measurement methods shown in FIG. 5 and FIG. 6, and therefore can achieve a same effect as the foregoing measurement methods.

In still another implementation, the communication apparatus 70 shown in FIG. 7 includes a processing module and a communication module. The processing module is configured to control and manage an action of the communication apparatus 70. For example, the processing module may integrate a function of the processing unit 701, and may be configured to support the communication apparatus 70 in performing steps such as step 501, step 602, step 502, step 503, and step 603 to step 605. The communication module may integrate functions of the sending unit and the receiving unit, for example, integrate a function of the sending unit 702 and communicate with another network entity, for example, communicate with a functional module or a network entity shown in FIG. 3. Further, the communication apparatus 70 may further include a storage module, configured to store instructions and/or data. When the instructions are executed by the processing module, the processing module is enabled to implement the foregoing method on the terminal side.

The processing module may be a processor, a controller, a module, or a circuit. The processing module may implement or execute various example logical blocks described with reference to content disclosed in embodiments of this application. The communication module may be a transceiver circuit, a pin, an interface circuit, a bus interface, a communication interface, or the like. The storage module may be a memory. When the processing module is a processor, the communication module is a communication interface, and the storage module is a memory, the communication apparatus 70 in this embodiment of this application may be the communication apparatus shown in FIG. 4.

In this embodiment of this application, the processor may be a general-purpose processor, a digital signal processor, an application-specific integrated circuit, a field programmable gate array or another programmable logic device, a discrete gate or transistor logic device, or a discrete hardware component. The processor can implement or execute the methods, steps, and logical block diagrams disclosed in embodiments of this application. The general-purpose processor may be a microprocessor or any conventional processor or the like. The steps of the method disclosed with reference to embodiments of this application may be directly performed by a hardware processor, or may be performed by using a combination of hardware in the processor and a software module.

In embodiments of this application, the memory may be a non-volatile memory, such as a hard disk drive (HDD) or a solid-state drive (SSD), or may be a volatile memory, such as a random access memory (RAM). The memory is any other medium that can carry or store expected program code in a form of an instruction or a data structure and that can be accessed by a computer, but is not limited thereto. The memory in this embodiment of this application may alternatively be a circuit or any other apparatus that can implement a storage function, and is configured to store instructions and/or data.

Figure 8:
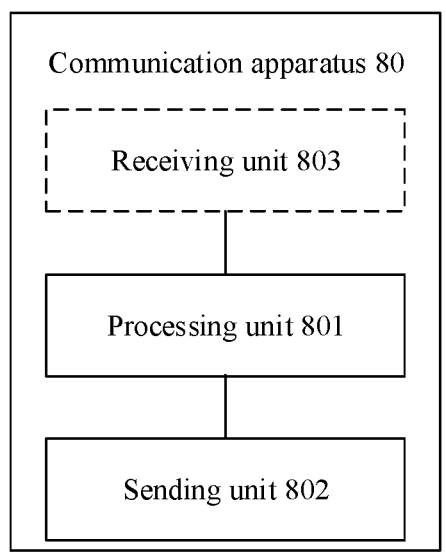
FIG. 8 is a schematic diagram of a composition of a communication apparatus 80 according to an embodiment of this application.

FIG. 8 is a diagram of a structure of a communication apparatus 80. The communication apparatus 80 may be a network device, a chip in a network device, a system-on-a-chip, another apparatus that can implement a function of the network device in the foregoing method, or the like. The communication apparatus 80 may be configured to perform the function of the network device in the foregoing method embodiments. In a possible implementation, the communication apparatus 80 shown in FIG. 8 includes a processing unit 801 and a sending unit 802.

The processing unit 801 is configured to determine that a measurement gap type corresponding to a first group of MOs is an MG or an NCSG. For example, the processing unit 801 may be further configured to support the communication apparatus 80 in performing step 504 and step 606.

The processing unit 801 is further configured to control, based on the measurement gap type corresponding to the first group of MOs, the sending unit 802 to perform data scheduling on a terminal. For example, the processing unit 801 may further be configured to support the communication apparatus 80 in performing step 505, step 606, and the like.

Specifically, the processing unit 801 may be configured to: determine that the measurement gap type corresponding to the first group of MOs is an NCSG, and determine a parameter of the NCSG based on a parameter of an MG pattern and determine a measurement behavior within a measurement length ML of the NCSG based on the parameter of the NCSG.

For related descriptions of the first group of MOs, the MG pattern, and a manner of determining the parameter of the NCSG, refer to the descriptions in the methods in FIG. 5 and FIG. 6. Details are not described again.

Further, the processing unit 801 may further generate scheduling information, and control the sending unit 802 to send the scheduling information to the terminal. The scheduling information is used for scheduling the terminal to perform uplink transmission after n slots or symbols after a first VIL end, and for scheduling the terminal to perform uplink transmission after n slots or symbols after a second VIL end.

Further, as shown in FIG. 8, the communication apparatus may further include a receiving unit 803.

The receiving unit 803 is configured to receive third information from the terminal. The third information indicates whether the terminal supports measurement of a third-type MO within an ML of the NCSG, and the third-type MO includes an MO requiring no MG and NCSG.

Specifically, all related content of the steps in the method embodiments in FIG. 5 and FIG. 6 may be cited in function descriptions of corresponding functional modules. Details are not described herein again. The communication apparatus 80 is configured to perform functions of the network device in FIG. 5 and FIG. 6, and can achieve a same effect as the foregoing measurement methods.

In another implementation, the communication apparatus 80 shown in FIG. 8 includes a processing module and a communication module. The processing module is configured to control and manage an action of the communication apparatus 80. The processing module may integrate a function of the processing unit 801, and may be configured to support the communication apparatus 80 in performing step 601, step 503, step 605, and the like. The communication module may integrate functions of the sending unit and the receiving unit, for example, integrate a function of the receiving unit 802, and communicate with another network entity, for example, communicate with a functional module or a network entity shown in FIG. 3. Further, the communication apparatus 80 may further include a storage module, configured to store instructions and/or data of the communication apparatus 80. When the instructions are executed by the processing module, the processing module may be enabled to implement the foregoing method on the network device side.

The processing module may be a processor, a controller, a module, or a circuit. The processor may implement or execute various example logical blocks described with reference to content disclosed in embodiments of this application. Alternatively, the processor may be a combination of processors implementing a computing function, for example, a combination of one or more microprocessors, or a combination of the DSP and a microprocessor. The communication module may be a transceiver circuit, a pin, an interface circuit, a bus interface, a communication interface, or the like. The storage module may be a memory. When the processing module is a processor, the communication module is a communication interface, and the storage module is a memory, the communication apparatus 80 in this embodiment of this application may be the communication apparatus shown in FIG. 4.

Figure 9:
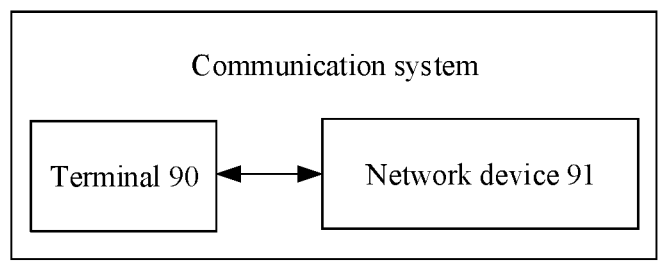
FIG. 9 is a schematic diagram of a composition of a communication system according to an embodiment of this application.

FIG. 9 is a diagram of a structure of a communication system according to an embodiment of this application. As shown in FIG. 9, the communication system may include a terminal 90 and a network device 91. It should be noted that FIG. 9 is merely an example of an accompanying drawing. Network elements included in the communication system shown in FIG. 9 and a quantity of the network elements are not limited in this embodiment of this application.

The terminal 90 has a function of the terminal in one or more methods shown in FIG. 5 and FIG. 6. The network device 91 has functions of the network device in the one or more methods shown in FIG. 5 and FIG. 6.

In embodiments of this application, "/" may represent an "or" relationship between associated objects. For example, A/B may represent A or B. "And/or" may indicate that there are three relationships between associated objects. For example, A and/or B may represent the following three cases: Only A exists, both A and B exist, and only B exists. A and B may be singular or plural. To facilitate description of the technical solutions in embodiments of this application, in embodiments of this application, terms such as "first" and "second" may be used to distinguish between technical features with same or similar functions. The terms such as "first" and "second" do not limit a quantity and an execution sequence, and the terms such as "first" and "second" do not indicate a definite difference. In embodiments of this application, the term such as "example" or "for example" is used to represent an example, an illustration, or a description. Any embodiment or design scheme described with "example" or "for example" should not be explained as having more advantages than another embodiment or design scheme. Use of the term such as "example" or "for example" is intended to present a related concept in a specific manner for ease of understanding.

In embodiments of this application, for a technical feature, "first", "second", "third", "A", "B", "C", "D", and the like are used for distinguishing between technical features in the technical feature. There is no sequential order or size order between the technical features described by "first", "second", "third", "A", "B", "C", and "D".

It should be understood that in the embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transmission" (transmit/transmission) refers to bidirectional transmission, and includes a sending action and/or a receiving action. Specifically, "transmission" in embodiments of this application includes data sending, data receiving, or data sending and data receiving. In other words, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communication system is a communication network.

Division into the modules in embodiments of this application is an example, is merely division into logical functions, and may be other division during actual implementation. In addition, functional modules in embodiments of this application may be integrated into one processor, or each of the modules may exist alone physically, or two or more modules may be integrated into one module. The integrated module may be implemented in a form of hardware, or may be implemented in a form of a software functional module.

All or a part of the technical solutions provided in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, a wireless control apparatus, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD)), a semiconductor medium, or the like.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

The foregoing descriptions are merely specific implementations of embodiments of this application, but are not intended to limit the protection scope of embodiments of this application. Any variation or replacement within the technical scope disclosed in embodiments of this application shall fall within the protection scope of embodiments of this application. Therefore, the protection scope of embodiments of this application shall be subject to the protection scope of the claims.

What is claimed is:

1. A method, comprising:
    determining, by a terminal, a measurement gap type corresponding to a first group of measurement objects (MO)s, wherein the measurement gap type comprises a measurement gap (MG) type or a network-controlled small gap (NCSG) type;
    measuring, by the terminal, the first group of MOs based on the measurement gap type corresponding to the first group of MOs; and
    determining, by the terminal, a data transmission behavior in a serving cell of the terminal based on the measurement gap type corresponding to the first group of MOs.

2. The method according to claim 1, further comprising:
    receiving, by the terminal, first information from a network device; and
    wherein determining, by the terminal, the measurement gap type corresponding to the first group of MOs comprises:
        determining, by the terminal based on the first information, the measurement gap type corresponding to the first group of MOs.

3. The method according to claim 2, wherein:
    the first information indicates the measurement gap type; and
    the first information is carried in second information, wherein the second information is configured to be used for configuring an MG pattern;
    the first information is carried in layer L1 signaling; or
    the first information is carried in layer L2 signaling.

4. The method according to claim 1, wherein the terminal determines that the measurement gap type corresponding to the first group of MOs is the NCSG type, and the method further comprises:
    determining, by the terminal, a measurement behavior within a measurement length (ML) of an NCSG based on a parameter of the NCSG by:

when the terminal supports measurement of a third-type MO within the ML of the NCSG, measuring, by the terminal, a second-type MO and the third-type MO within the ML of the NCSG, wherein a measurement behavior of measuring the second-type MO and the third-type MO by the terminal is the same as a measurement behavior of the terminal outside a measurement gap length (MGL) of an MG; or when the terminal does not support measurement of a third-type MO within the ML of the NCSG, measuring, by the terminal, only a second-type MO within the ML of the NCSG, wherein a measurement behavior of measuring the second-type MO by the terminal is the same as a measurement behavior of the terminal within the MGL of the MG; and wherein the second-type MO comprises an MO requiring the NCSG, and the third-type MO comprises an MO requiring no MG and NCSG.

5. The method according to claim 1, further comprising:
performing, by the terminal, L1 measurement of the serving cell of the terminal within a measurement length (ML) of an NCSG.

6. The method according to claim 1, wherein the terminal determines that the measurement gap type corresponding to the first group of MOs is the NCSG type; and
wherein an MO measured within an NCSG corresponds to a second measurement behavior, an MO measured outside the NCSG corresponds to a third measurement behavior, and the second measurement behavior is different from the third measurement behavior.

7. The method according to claim 6, wherein the second measurement behavior comprises one or more of the following:
a carrier specific scaling factor (CSSF) corresponding to each MO within the NCSG is obtained according to a second calculation manner, and the second calculation manner is used for measurement within an MG; or
a scaling factor Klayer1 for L1 measurement is determined based on a measurement period of an L1 measurement reference signal within the NCSG.

8. The method according to claim 6, wherein:
the third measurement behavior comprises one or more of the following:
when the NCSG and a synchronization signal and physical broadcast channel block measurement timing configuration (SMTC) do not overlap, a carrier specific scaling factor (CSSF) corresponding to each MO outside the NCSG is determined according to a calculation manner used for measurement outside an MG;
when the NCSG and the SMTC do not overlap, a scaling factor Kp for L3 measurement is greater than 1;
when the NCSG and the SMTC do not overlap, a scaling factor Klayer1 for L1 measurement is determined based on a measurement period of an L1 measurement reference signal outside the NCSG; and
a calculation manner used for calculating the CSSF when the NCSG and the SMTC overlap is a calculation manner within the MG, and the scaling factor Klayer1 for L1 measurement is determined based on a measurement period of an L1 measurement reference signal within the NCSG.

9. The method according to claim 6, wherein:
the first group of MOs comprises a second-type MO and a third-type MO, the second-type MO and a deactivated MO in the third-type MO are measured within the NCSG, and an MO other than the deactivated MO in the third-type MO is measured outside the NCSG; and
the second-type MO comprises an MO requiring an NCSG, and the third-type MO comprises an MO requiring no MG and NCSG.

10. The method according to claim 1, wherein the first group of MOs comprises a deactivated secondary component carrier (SCC), and the terminal determines that the measurement gap type corresponding to the first group of MOs is the NCSG type; and
wherein measuring, by the terminal, the first group of MOs based on the measurement gap type corresponding to the first group of MOs comprises:
determining, by the terminal based on a parameter of an NCSG and attribute information of the deactivated SCC, a measurement behavior of the deactivated SCC; or
determining, by the terminal based on attribute information of the deactivated SCC, a measurement behavior of the deactivated SCC.

11. The method according to claim 10, wherein the attribute information of the deactivated SCC comprises a synchronization signal and physical broadcast channel block measurement timing configuration (SMTC) of the deactivated SCC; and
wherein determining, by the terminal based on the parameter of the NCSG and the attribute information of the deactivated SCC, the measurement behavior of the deactivated SCC comprises:
when the NCSG and the SMTC of the deactivated SCC completely or partially overlap, measuring, by the terminal, the deactivated SCC within the NCSG; or
when the NCSG and the SMTC of the deactivated SCC do not overlap, measuring, by the terminal, the deactivated SCC outside the NCSG.

12. The method according to claim 10, wherein the attribute information of the deactivated SCC comprises a measurement period; and
wherein determining, by the terminal based on attribute information of the deactivated SCC, the measurement behavior of the deactivated SCC comprises:
when the measurement period is greater than or equal to a first value, measuring, by the terminal, the deactivated SCC within the NCSG, wherein the NCSG and a SMTC of the deactivated SCC completely or partially overlap; or
when the measurement period is less than a first value, measuring, by the terminal, the deactivated SCC outside the NCSG.

13. A method, comprising:
determining, by a network device, a measurement gap type corresponding to a first group of measurement objects (MO)s, wherein the measurement gap type comprises a measurement gap (MG) type or a network-controlled small gap (NCSG) type; and
performing, by the network device, data scheduling on a terminal based on the measurement gap type corresponding to the first group of MOs.

14. The method according to claim 13, further comprising:
sending, by the network device, first information to the terminal, wherein the first information is configured to be used for determining the measurement gap type corresponding to the first group of MOs.

15. The method according to claim 14, wherein the first information indicates the measurement gap type; and wherein:
  the first information is carried in second information, wherein the second information is configured to be used for configuring a measurement gap pattern (MG pattern) for the terminal;
  the first information is carried in layer L1 signaling; or
  the first information is carried in layer L2 signaling.

16. The method according to claim 14, wherein the first information indicates whether the terminal is allowed to switch the measurement gap type, and determining, by the network device, the measurement gap type corresponding to the first group of MOs comprises:
  determining, by the network device based on the first information, that the terminal is allowed to switch the measurement gap type, and determining, by the network device according to a first rule, the measurement gap type corresponding to the first group of MOs, wherein the first rule comprises: when there is no first-type MO in the first group of MOs, the measurement gap type corresponding to the first group of MOs is the NCSG type; or when there is a first-type MO in the first group of MOs, the measurement gap type corresponding to the first group of MOs is the MG type; and the first-type MO comprises an MO requiring an MG; or
  determining, by the network device based on the first information, that the terminal is not allowed to switch the measurement gap type, and determining, by the network device, that the measurement gap type corresponding to the first group of MOs is the MG type.

17. The method according to claim 16, further comprising:
  determining, by the network device, a parameter of the NCSG based on the parameter of an MG pattern by:
    using a measurement gap repetition period (MGRP) of the MG pattern as a visible interruption repetition period (VIRP) of a NCSG; and
    using, as a measurement length (ML) of the NCSG, a time length obtained by removing a first visible interruption length (VIL) and a second VIL from a measurement gap length (MGL) of the MG pattern; and
  wherein duration of the first VIL and duration of the second VIL are equal to duration of a VIL corresponding to the MG pattern.

18. The method according to claim 17, wherein the data scheduling comprises uplink data scheduling, and performing, by the network device, data scheduling on the terminal based on the measurement gap type corresponding to the first group of MOs comprises:
  generating, by the network device, scheduling information, and sending the scheduling information to the terminal, wherein the scheduling information is used for scheduling the terminal to perform uplink transmission after n slots or symbols after the first VIL end, and for scheduling the terminal to perform uplink transmission after n slots or symbols after the second VIL end, and wherein n is an integer greater than or equal to 0, and n is predefined in a protocol or is determined based on a communication parameter of the terminal.

19. The method according to claim 17, wherein:
  when the MG pattern is configured at a granularity of the terminal, or the MG pattern is configured at a granularity of a frequency range (FR) and that corresponds to a first FR, the VIL corresponding to the MG pattern is 0.5 milliseconds (ms); or
  when the MG pattern is configured at a granularity of an FR and that corresponds to a second FR, the VIL corresponding to the MG pattern is 0.25 ms.

20. A communication apparatus, wherein the communication apparatus comprises one or more processors, and the one or more processors are configured to:
  determine a measurement gap type corresponding to a first group of measurement objects (MO)s, wherein the measurement gap type comprises a measurement gap (MG) type or a network-controlled small gap (NCSG) type;
  measure the first group of MOs based on the measurement gap type corresponding to the first group of MOs; and
  determine a data transmission behavior in a serving cell of a terminal based on the measurement gap type corresponding to the first group of MOs.

* * * * *